US012604156B2

(12) United States Patent
Beale et al.

(10) Patent No.: US 12,604,156 B2
(45) Date of Patent: Apr. 14, 2026

(54) COMMUNICATIONS DEVICE, INFRASTRUCTURE EQUIPMENT, LOCATION SERVER AND METHODS

(71) Applicant: Sony Group Corporation, Tokyo (JP)

(72) Inventors: Martin Warwick Beale, Basingstoke (GB); Kazuyuki Shimezawa, Basingstoke (GB); Shin Horng Wong, Basingstoke (GB); Basuki Priyanto, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 407 days.

(21) Appl. No.: 18/018,875

(22) PCT Filed: Aug. 5, 2021

(86) PCT No.: PCT/EP2021/071946
§ 371 (c)(1),
(2) Date: Jan. 31, 2023

(87) PCT Pub. No.: WO2022/029269
PCT Pub. Date: Feb. 10, 2022

(65) Prior Publication Data
US 2023/0345206 A1     Oct. 26, 2023

(30) Foreign Application Priority Data
Aug. 7, 2020    (EP) ..................................... 20190158

(51) Int. Cl.
*H04W 4/029*     (2018.01)
*H04W 72/23*     (2023.01)

(52) U.S. Cl.
CPC ........... *H04W 4/029* (2018.02); *H04W 72/23* (2023.01)

(58) Field of Classification Search
CPC ... H04W 4/029; H04W 72/23; G01S 2205/01; G01S 5/0205; H04L 5/0048
(Continued)

(56) References Cited

U.S. PATENT DOCUMENTS

2019/0261354 A1 *   8/2019   Fakoorian ............. H04L 1/1893
2019/0364390 A1 *  11/2019   Kurras .................. H04W 16/28
(Continued)

FOREIGN PATENT DOCUMENTS

WO     2020/068310 A1     4/2020

OTHER PUBLICATIONS

International Search Report and Written Opinion mailed on Jan. 11, 2022, received for PCT Application PCT/EP2021/071946, filed on Aug. 5, 2021, 14 pages.
(Continued)

*Primary Examiner* — Hirdepal Singh
(74) *Attorney, Agent, or Firm* — XSENSUS LLP

(57)     ABSTRACT

A method of operating a communications device in a wireless communications network comprising determining first positioning signal resources, the first positioning signal resources comprising communication resources allocated for transmission or reception by the communications device of positioning signals associated with a positioning procedure, determining other communication resources allocated for transmission or reception by the communications device of other signals, determining that the communications device cannot use both the first positioning signal resources for the transmission or reception of the positioning signals and the other communication resources for the transmission or reception of the other signals, determining relative priorities of the first positioning signal resources and the other communication resources, and based on the relative priorities, controlling a transmitter or receiver of the communi-
(Continued)

cations device to transmit or receive the positioning signals using the first positioning signal resources or to transmit or receive the other signals using the other communication resources.

19 Claims, 9 Drawing Sheets

(58) Field of Classification Search
   USPC ........................................................ 455/456.3
   See application file for complete search history.

(56) References Cited

U.S. PATENT DOCUMENTS

| | | | | |
|---|---|---|---|---|
| 2020/0014487 | A1* | 1/2020 | Akkarakaran | ........ H04L 5/0048 |
| 2020/0154449 | A1 | 5/2020 | Akkarakaran et al. | |
| 2021/0274543 | A1* | 9/2021 | Ryu | ....................... H04W 72/56 |
| 2023/0199522 | A1* | 6/2023 | Manolakos | ........... H04W 64/00 |
| | | | | 455/456.1 |
| 2023/0283424 | A1* | 9/2023 | Rao | ....................... H04L 5/0053 |
| | | | | 370/329 |

OTHER PUBLICATIONS

3GPP, "NR; NR and NG-RAN Overall Description; Stage 2 (Release 15)", 3GPP TS 38.300 V15.2.0, Jun. 2018, pp. 1-87.

Holma et al., "LTE for UMTS OFDMA and SC-FDMA Based Radio Access", John Wiley & Sons, 2009, 232 pages.

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16)", 3GPP TS 36.305 V16.1.0, Jul. 2020, pp. 1-92.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 v.16.1.0, Jul. 2020, pp. 1-114.

3rd Generation Partnership Project; Technical Specification Group Radio Access Network; NR; Physical layer procedures for data (Release 16), 3GPP TS 38.214, "NR: Physical layer procedures for data (Rel-16)", 163pp.

3rd Generation Partnership Project; Technical Specification Group Radio Access Network; NR; Physical channels and modulation (Release 16), 3GPP TS 38.211, "NR: Physical channels and modulation (Rel-16)", 131pp.

3rd Generation Partnership Project; Technical Specification Group Radio Access Network; NG-RAN; NR Positioning Protocol A (NRPPa), (Release 16), 3GPP TS 38.455, NG-RAN; NR Positioning Protocol A (NRPPa) (Rel-16), 60pp.

* cited by examiner

262

Location
server

472c

472a

270

472b 472a          270          472b          472c eNB1          UE          eNB2          eNB3 t1

480a          ΔT1          480b t2

482a          ΔT2          482b

COMMUNICATIONS DEVICE, INFRASTRUCTURE EQUIPMENT, LOCATION SERVER AND METHODS

CROSS-REFERENCE TO RELATED APPLICATIONS

This application is based on PCT filing PCT/EP2021/071946, filed on Aug. 5, 2021, which claims the Paris Convention priority of European Patent Application No. 20190158.4, filed on Aug. 7, 2020, the contents of each are incorporated herein by reference in their entirety.

BACKGROUND

Field

The present disclosure relates to communications devices, infrastructure equipment, location server and methods for the determination of a location of a wireless communications device.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles. For some such applications it is desirable to determine a location of a communications device. There is thus a technical challenge to be able to determine a location of a communications device in an efficient manner while satisfying the requirements of the different applications.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
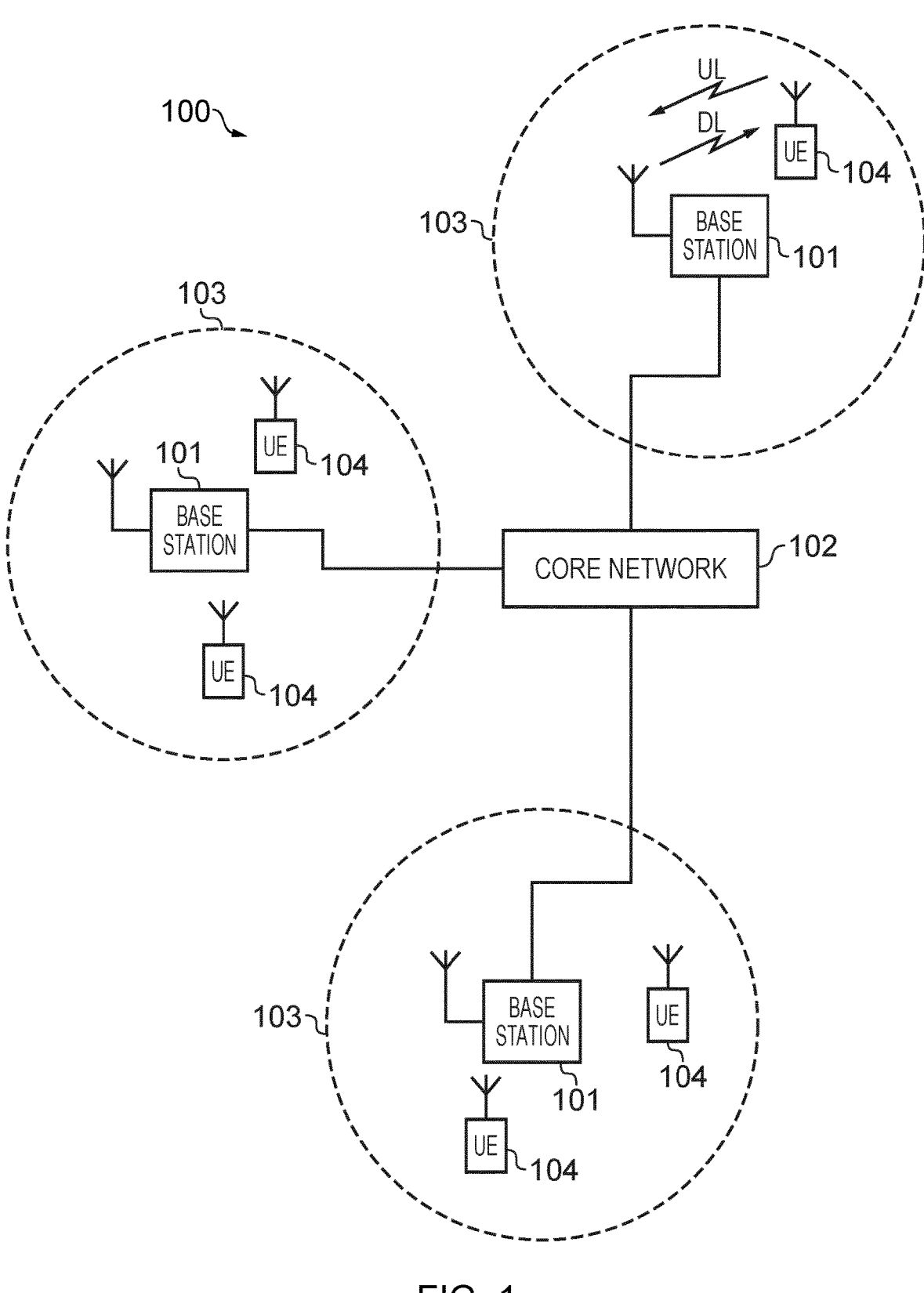
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio (NR) Access Technology (5G)

Figure 2:
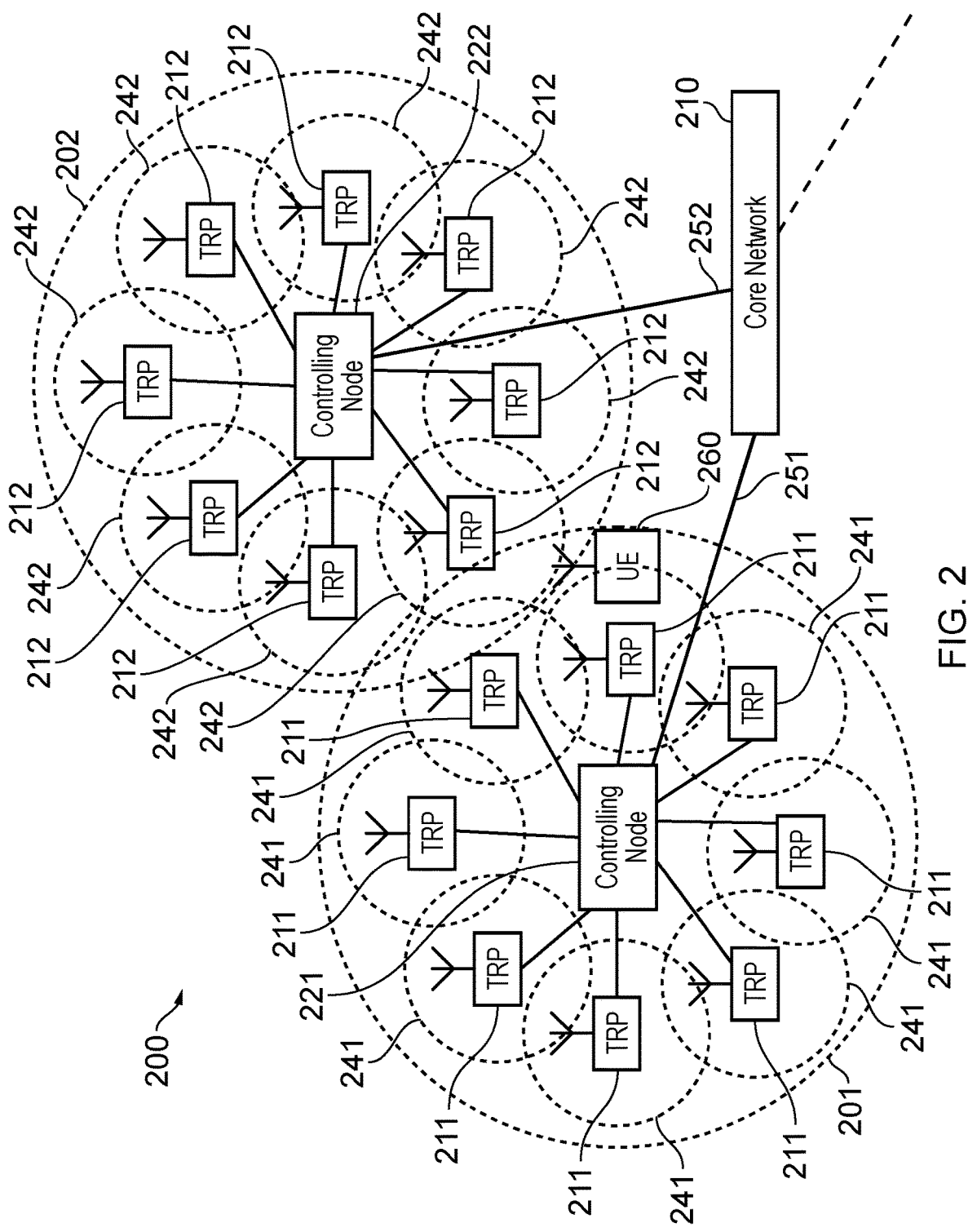
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases, communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
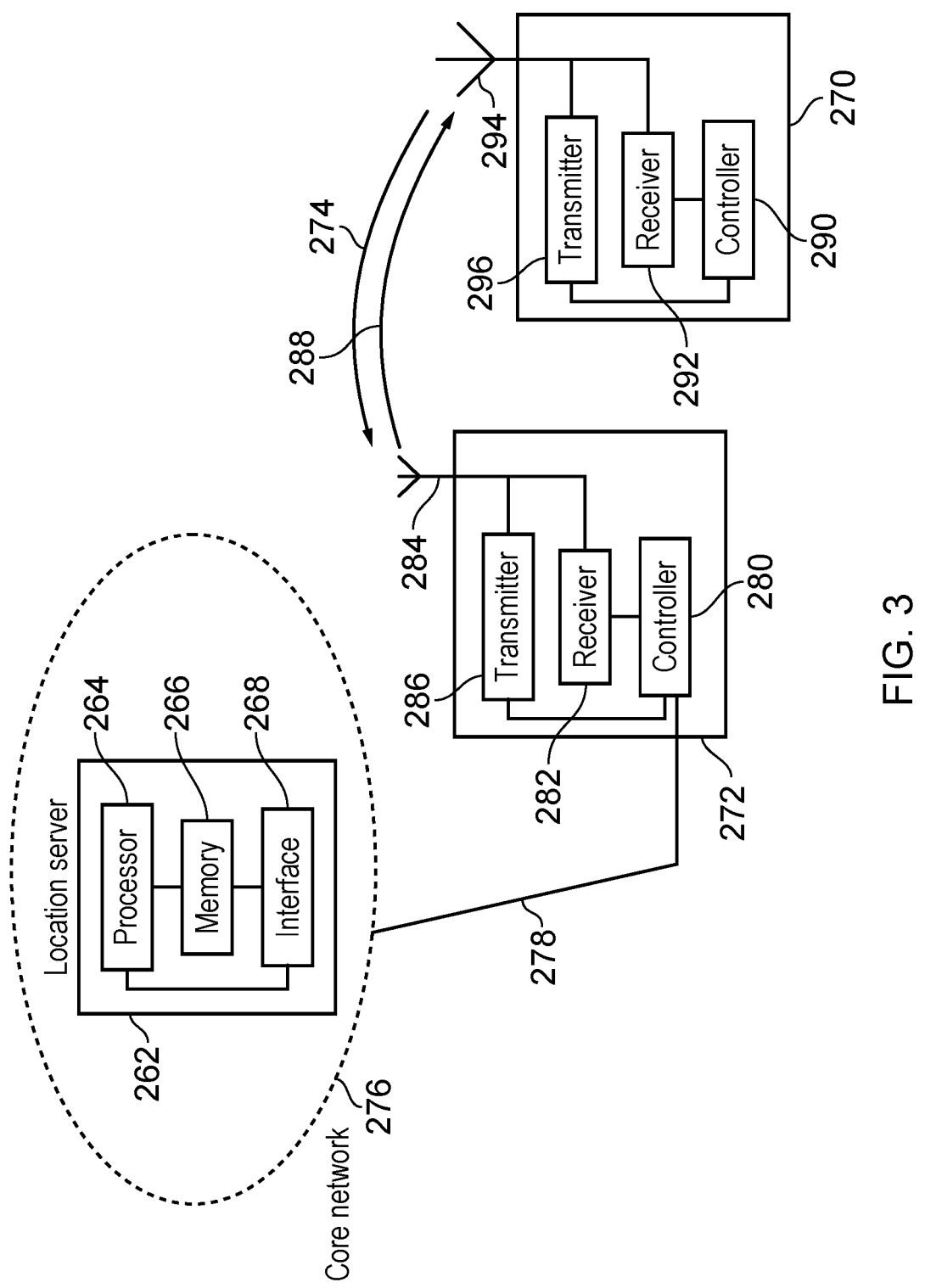
FIG. 3 is a schematic block diagram of an example infrastructure equipment and communications device which may be configured in accordance with example embodiments.

A more detailed illustration of a communications device 270 and an example network infrastructure equipment 272, which may be thought of as a base station 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/ chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/ chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

The core network 276 may comprise a location server 262, which may implement the functionality of an Enhanced Serving Mobile Location Centre (E-SMLC), such as that defined in [3] or [4]. The location server may implement other functions, such as a location management function (LMF).

The location server 262 may comprise a processor 264, coupled to a memory 266 (which may comprise non-volatile memory) and network interface 268.

The location server 262 may be connected via the network interface 268 to the infrastructure equipment 272 via one or more intermediate core network entities (such as a 3GPP LTE mobility management entity, MME, or a 3GPP NR access and management function, AMF), not shown in FIG. 3.

Connections from the location server 262 to the infrastructure equipment 272 may be in accordance with architectures defined in [3] or [4].

The processor 264 may be configured to carry out instructions which are stored on a computer readable medium, such as non-volatile memory 266. Processing steps described herein may be carried out by the processor 264 in conjunction with a random access memory, operating according to instructions stored on a computer readable medium.

Location Techniques

Current 3GPP specifications define functionality for identifying an absolute location of a UE or communications device (such as the communications device 270 of FIG. 3) which is configured to operate in accordance with those specifications, and in communications with a wireless communications network operating according to those specifications. There are various positioning techniques that are specified, including:

Observed time difference of arrival (OTDOA), whereby the timing of signals transmitted from various base stations/infrastructure equipment is measured at the communications device, and the location of the communications device is determined based on multilatera-
tion (e.g. trilateration) using these timing measure-
ments. This is described in further detail below.
Uplink time difference of arrival (UTDOA), in which the
timing of signals transmitted by the communications
device is measured by different infrastructure equip-
ment (gNBs) and the network performs multilateration
to determine communications device (UE) position.
Multi-round trip time (RTT). This technique uses mea-
surements of a round-trip time of signals between the
communications device and multiple infrastructure
equipment.
The above techniques rely on the measurement (of a
signal strength and/or of a relative time of arrival) of signals
transmitted by the communications device 270 and received
at infrastructure equipment of the wireless communications
network, or of signals transmitted by the infrastructure
equipment and received at the communications device 270.

Observed Time Difference of Arrival (OTDOA)

Figure 4A:
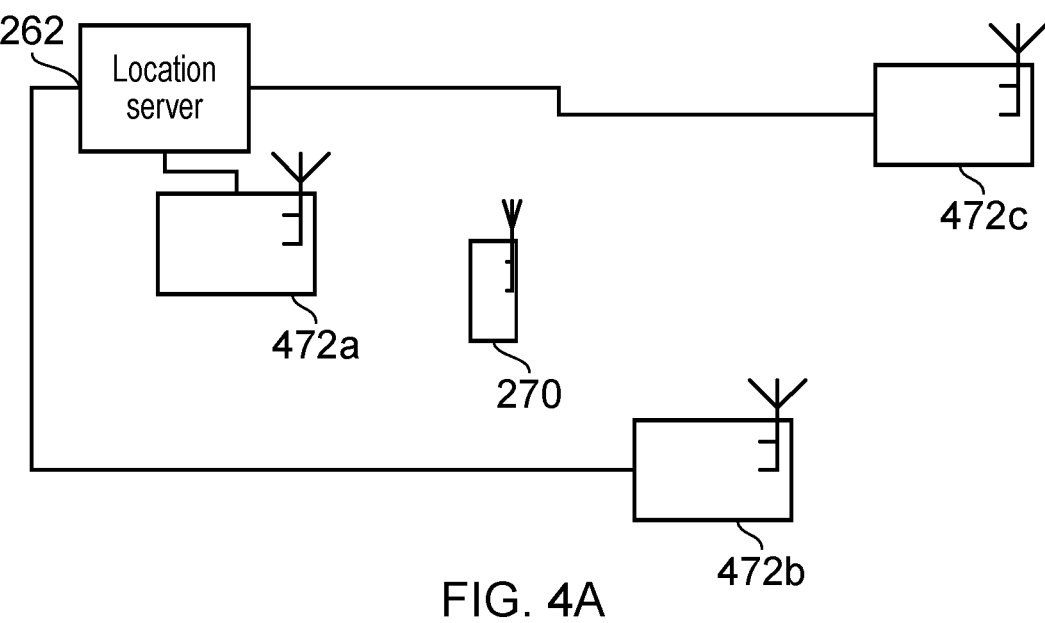
FIG. 4A and FIG. 4B illustrate the principles of location estimation using OTDOA in accordance with conventional techniques.
Figure 4B:
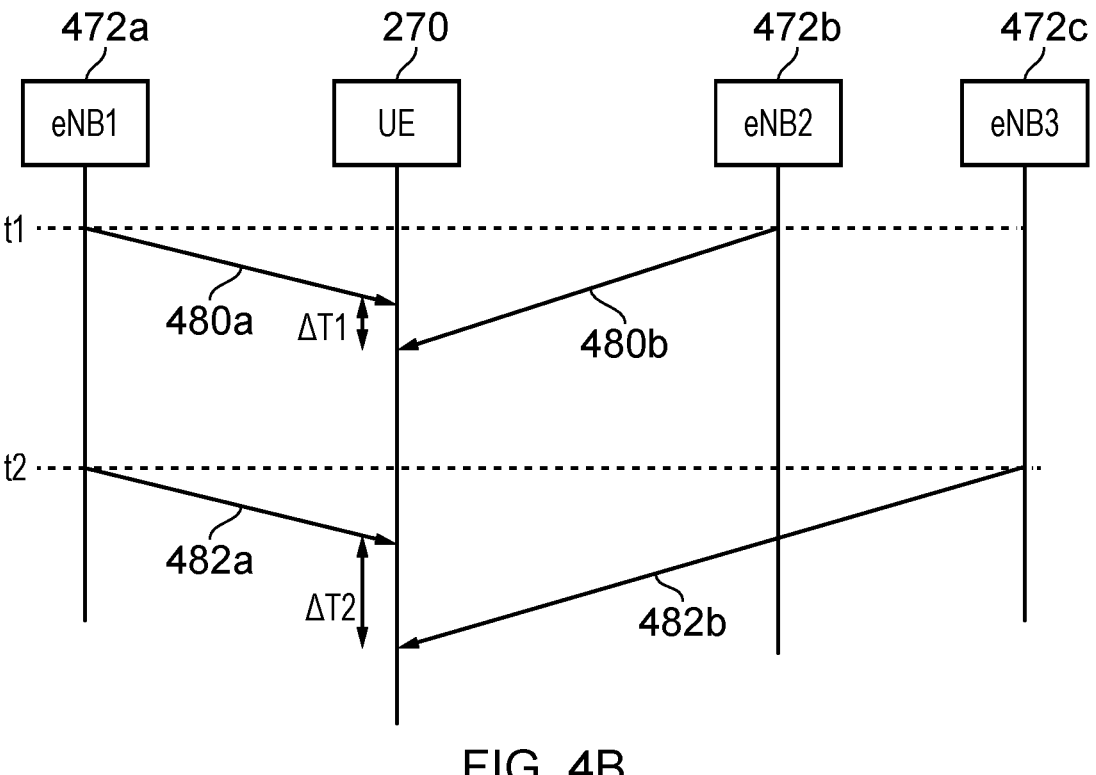

FIG. 4A and FIG. 4B illustrate the principles of location
estimation using OTDOA in accordance with conventional
techniques.

FIG. 4A and FIG. 4B show three base stations, or infra-
structure equipment, 472a, 472b, 472c, which may broadly
correspond to the base stations 101 of FIG. 1, the TRPs 211,
212 of FIG. 2 or the infrastructure equipment 272 of FIG. 3.
The first base station 472a is the serving base station for the
communications device 270. Also shown is the location
server 262, which may be connected to each of the infra-
structure equipment 472a, 472b, 472c.

As shown in FIG. 4B, the communications device 270
measures a first time difference ΔT1, which is the difference
of arrival times of signals 480a, 480b transmitted at time t1
from the first and second base stations 472a, 472b, respec-
tively. The communications device 270 also measures a
second time difference ΔT2 which is the difference of arrival
times of signals 482a, 482b transmitted at time t2 from the
first and third base stations 472a, 472c, respectively. For
clarity, t1 and t2 are shown as different in the example of
FIG. 4B, but they may be the same (in which case signals
482a and 480a may correspond to the same signals). The
signals 480a, 480b, 482a, 482b may be reference signals,
such as a conventional LTE primary synchronisation signal
(PSS) or secondary synchronisation signal (SSS). The sig-
nals may be specifically for the purpose of location mea-
surements, such as conventional positioning reference sig-
nals (PRS) specified in 3GPP Release 9 for LTE and 3GPP
Release 16 for NR.

The first and second time differences ΔT1, ΔT2 are
reported via the serving base station 472a to the location
server 262, which knows the actual location of the three base
stations 472a, 472b, 472c and is thus able to determine,
based on the first and second time differences ΔT1, ΔT2, the
location of the communications device 270. The time dif-
ference report may be a conventional Reference Signal Time
Difference (RSTD) report as specified for 3GPP LTE and
NR system.

For greater accuracy, corresponding measurements may
be taken of the time difference of arrival of further signals
from additional base stations.

It will be appreciated that the signals transmitted by the
base stations need not be simultaneous, if any offset in their
transmission times is known.

Uplink Time Difference of Arrival

3GPP NR also supports UTDOA (Uplink Time Difference
of Arrival) and other positioning methods, as described in
[4].

In Uplink Time Difference Of Arrival (UTDOA), the
communications device 270 transmits an uplink signal such
as a Sounding Reference Signal (SRS) that is received by the
multiple infrastructure equipment 472a, 472b, 472c. The
SRS (uplink pilot) transmitted from the communications
device 270 may arrive at these infrastructure equipment at
different times. The infrastructure equipment 472a, 472b,
472c (which may be synchronised to each other, for example
using a time derived from a GPS receiver) determine these
times of arrival and send these timings to the location server
262. The location server 262 calculates the location of the
communications device 270 based on multilateration.

Signalling to Support Positioning Techniques

In accordance with conventional techniques, location
determination may be broadly under the control of one or
more core network entities.

For example, in accordance with a known 3GPP NR
positioning architecture, a request for a location service
associated with a UE may be received at an Access and
Mobility Function (AMF) of a 5G core network. In
response, the AMF may send a location service request to a
Location Management Function (LMF) which has a con-
nection to an E-SMLC or location server (LS) that has
NR/E-UTRAN access information. The access information
may include information such as the positioning capability
of the UE or the PRS configuration of each infrastructure
equipment (gNB or eNB) in the NR/E-UTRAN radio access
network.

In response to the location service request, the LS may
trigger the UE to perform positioning measurements. In the
case of DL-TDoA (Downlink-Time Difference of Arrival) or
DL-AoD (Downlink-Angle of Departure), the UE performs
positioning measurements based on the Positioning Refer-
ence Signals (PRS) that are transmitted by multiple infra-
structure equipment. PRS are typically transmitted periodi-
cally and simultaneously from multiple gNBs. The UE
performs RSTD (reference signal time difference) measure-
ments and/or RSRP (reference signal received power) mea-
surements. The UE transmits back the positioning measure-
ment report to the E-SMLC via one of the gNBs. The
E-SMLC calculates the positioning estimate based on the
received positioning measurement(s).

Figure 5:
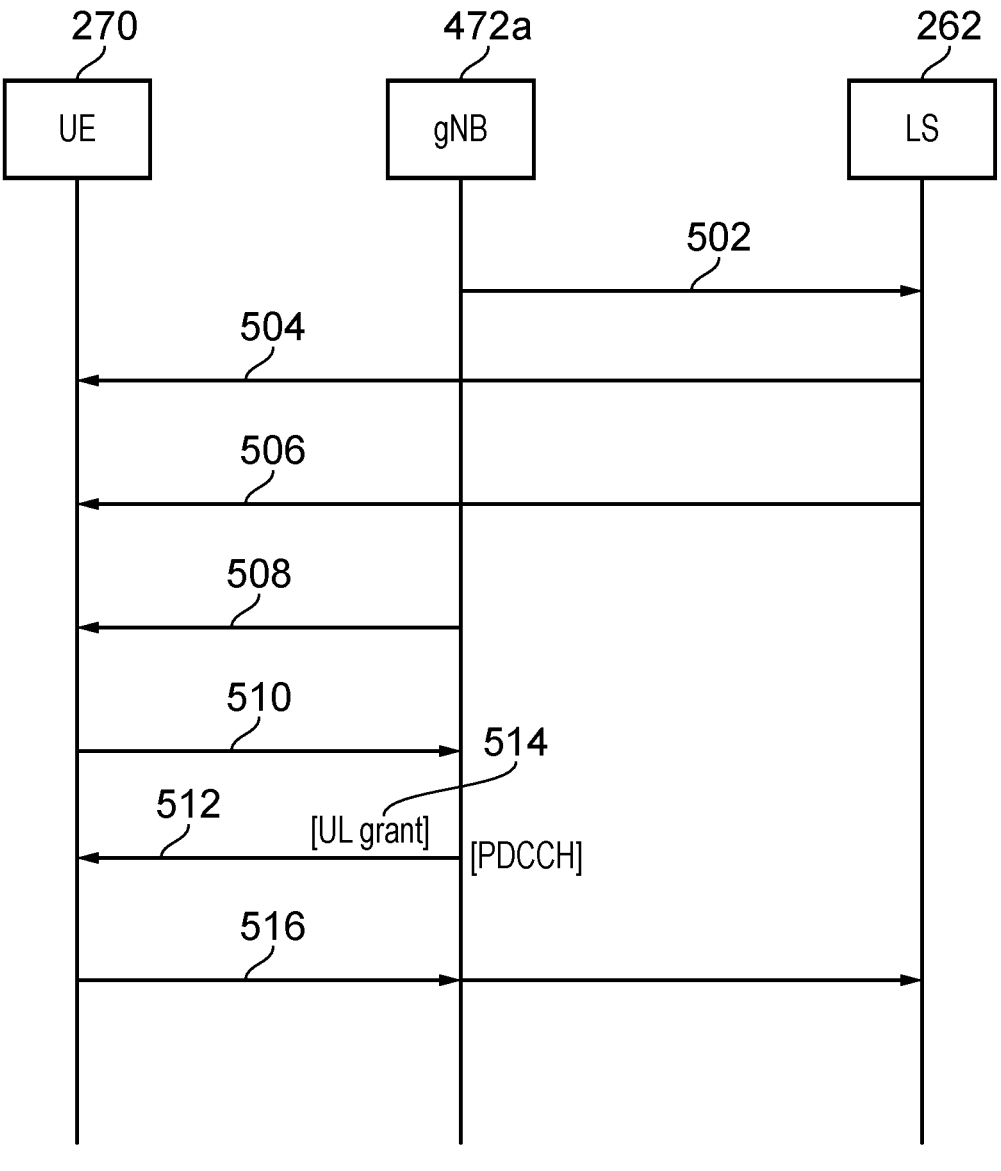
FIG. 5 is a message sequence chart which shows aspects of signalling associated with a positioning procedure, in accordance with known techniques.

FIG. 5 is a message sequence chart which shows aspects
of signalling associated with a positioning procedure, in
accordance with known techniques.

Initially, the infrastructure equipment 472a transmits a
PRS configuration indication 502 to the LS 262, which
indicates communications resources on which it will peri-
odically transmit PRS 508.

Based on the PRS configuration indication 502, and other
PRS configuration indications received from other infra-
structure equipment, the LS 262 may transmit a PRS indi-
cation 504 to the communications device 270. The PRS
indication 504 may indicate the communication resources
used by multiple infrastructure equipment for the periodic
transmission of PRS.

When an LS is subsequently triggered to initiate a posi-
tioning procedure (e.g. in response to a request from an
AMF), the LS 262 sends a positioning measurement request
506 to the UE 270.

In response to the positioning measurement request 506,
and based on the PRS indication 504, the UE 270 identifies
communication resources in which the PRS are to be trans-
mitted by the infrastructure equipment 472a, and by other
infrastructure equipment. The communications device 270
performs measurements of the PRS signals 508 (transmitted
by the infrastructure equipment 472a) and other PRS signals

9

10

(not shown) transmitted by the other infrastructure equipment, transmitted using these communication resources. The measurements may be performed within a measurement gap, particularly when PRS from multiple gNB(s) on inter-frequency carriers are scheduled.

FIG. 5 shows only PRS 508 transmitted by a single infrastructure equipment 472a, however it will be appreciated that PRS transmitted by other infrastructure equipment (such as the infrastructure equipment 472b, 472c of FIG. 4) may be measured.

Once the UE 270 has completed the measurements, the UE 270 may transmit an uplink scheduling request (SR) 510 to the serving gNB (infrastructure equipment 472a in the example of FIG. 5). In response to receiving the SR 510, the serving gNB 472a sends an uplink (UL) grant 514 in a DCI 512 that is transmitted using resources of a physical downlink control channel (PDCCH). The UL grant 514 may allocate resources of a physical uplink shared channel (PUSCH).

Using the resources indicated by the UL grant 514, the UE 270 transmits a positioning measurement report 516, comprising an indication of the results of the measurements of the PRS 508, to the LS 262, via the infrastructure equipment 472a. The positioning measurement report 514 may comprise results of measurements of the PRS 508 as well as the results of measurements of PRS transmitted by other infrastructure equipment. The measurement results may be 'relative' measurements, such as a time difference between the time of reception of PRS 508 transmitted by the serving gNB 472a and the time of reception of other PRS transmitted by other gNB(s).

The LS 262 determines the location of the UE 270 based on the measurement results and based on known location information associated with the infrastructure equipment, and may provide the determined location to the UE 270 and/or to another entity (not shown in FIG. 5).

Aperiodic PRS Transmission

The transmission of continuous periodic PRS results in a trade-off between use of communication resources and positioning procedure latency: higher frequency PRS transmission can reduce the latency for a positioning procedure, but can result in high use of communication resources. These communication resources may be wasted if no communications device is currently engaged in a positioning procedure.

To mitigate this trade-off, PRS may be transmitted aperiodically, as disclosed in [5], the contents of which is hereby incorporated by reference in its entirety.

In an example of aperiodic PRS transmission, an SMLC may provide scheduling information for aperiodic PRS transmissions to a plurality of infrastructure equipment and to a communications device, in response to receiving a positioning request in respect of the communications device.

The scheduling information may be transmitted to multiple infrastructure equipment.

Based on the scheduling information, the infrastructure equipment transmit PRS in accordance with the scheduling information.

Based on the scheduling information, the communications device determines the communication resources used for the transmission of the aperiodic PRS, performs measurements of the PRS, and transmits a positioning measurement report to the SMLC via a serving infrastructure equipment.

An example positioning procedure using aperiodic PRS, which may be adapted in accordance with the presently disclosed technique, may comprise the following steps:

1) The network (e.g. Service Mobile Location Center, SMLC, or enhanced-SMLC, which may be imple-mented in a location server within a core network) requests the communications device to provide or update positioning related information. This may be in response to a determination that, for example, an authority (e.g. police, emergency response unit, etc.) want to know/track a UE position. Alternatively, the procedure may be triggered by the UE, for example, when the user makes an emergency call (911 or 112 call).

Communications between the location server and communications device may use a conventional LPP protocol. Communications between the location server and a gNB may use a conventional LPPa protocol. The signalling between the location server and NR gNodeBs is specified in the NR PPA protocol in [8].

2) The UE provides information to the network (e.g. SMLC or gNB) such as the best selected cells and/or beams of surrounding cells in order to enable the corresponding base-stations to transmit PRS using that reported beam directly to the network. The indication and the information can be sent via a higher layer protocol (e.g. LPP protocol).

3) The network (e.g. SMLC) schedules/configures the aperiodic PRS to be transmitted based on the received information.

4) The location server orders appropriate base-stations to transmit a configured PRS on a specific beam and at a specific time.

5) The serving base-station indicates to the UE the scheduling of aperiodic PRS transmission i.e. it indicates information on when and where (in time/frequency) the PRS transmission occurs. The PRS can be transmitted according to a one-time transmission and/or semi-persistent transmission. Alternatively, the indication to the UE comes from SMLC.

6) Base-stations transmit aperiodic PRS. These PRS can be transmitted in dedicated resources and/or they can overlap with periodic PRS.

7) Once the positioning procedure has been established, a UE can report the positioning measurement directly to the base-station, possibly involving a beam management procedure. Alternatively, the report can be sent to SMLC.

As described above, conventional location determination techniques require the transmission and/or reception of signals associated with a location determination technique. However, there is a need to ensure that the transmission and/or reception of such signals does not inappropriately impact the transmission and/or reception of other signals, which may be associated with different applications and/or quality of service requirements and vice versa.

Embodiments of the present technique can provide a method of operating a communications device in a wireless communications network, the method comprising determining first positioning signal resources, the first positioning signal resources comprising communication resources allocated for transmission or reception by the communications device of positioning signals associated with a positioning procedure, determining other communication resources allocated for transmission or reception by the communications device of other signals, and determining that the communications device cannot use both the first positioning signal resources for the transmission or reception of the positioning signals and the other communication resources for the transmission or reception of the other signals. The method further comprises determining relative priorities of the first positioning signal resources and the other communication resources, and based on the relative priorities, controlling a transmitter or receiver of the communications device to transmit or receive the positioning signals using the first positioning signal resources or to transmit or receive the other signals using the other communication resources.

In some embodiments, the relative priority of the first positioning signal resources is higher than the relative priority of the other communication resources, and the method comprises transmitting or receiving the first signals associated with the positioning procedure using the first communication resources, and refraining from transmitting or receiving the other signals using the other communication resources.

Accordingly, embodiments of the present technique can ensure that a communications device transmits and/or receives signals associated with a positioning procedure only when it is appropriate in light of a priority associated with the positioning procedure and/or of other signals associated with different applications and/or quality of service requirements.

In some embodiments, refraining from transmitting or receiving the other signals using the other communication resources may comprise puncturing a transmission of lower priority signals in order to permit a transmission or reception of higher priority signals.

In some embodiments, refraining from transmitting or receiving the other signals using the other communication resources may comprise refraining entirely from transmitting or receiving lower priority signals in order to permit a transmission or reception of higher priority signals.

In accordance with embodiments of the present technique, a communications device identifies communications resources to be used for the transmission of signals associated with a positioning procedure, which may conflict with other communication resources. The other communication resources may be allocated by a wireless communications network for the transmission of data to or by the communications device. The communications device determines a relative priority of the signals and selectively transmits or receives the signals associated with a positioning procedure and/or signals transmitted using the other communications resources, based on the determined relative priority.

In some embodiments, the signals associated with a positioning procedure are reference signals (such as PRS or SRS). The reference signals may be transmitted by, or to, multiple infrastructure equipment of a wireless communications network, and the positioning procedure may require measurements of these signals in order to determine the location of the communications device.

Figure 6:
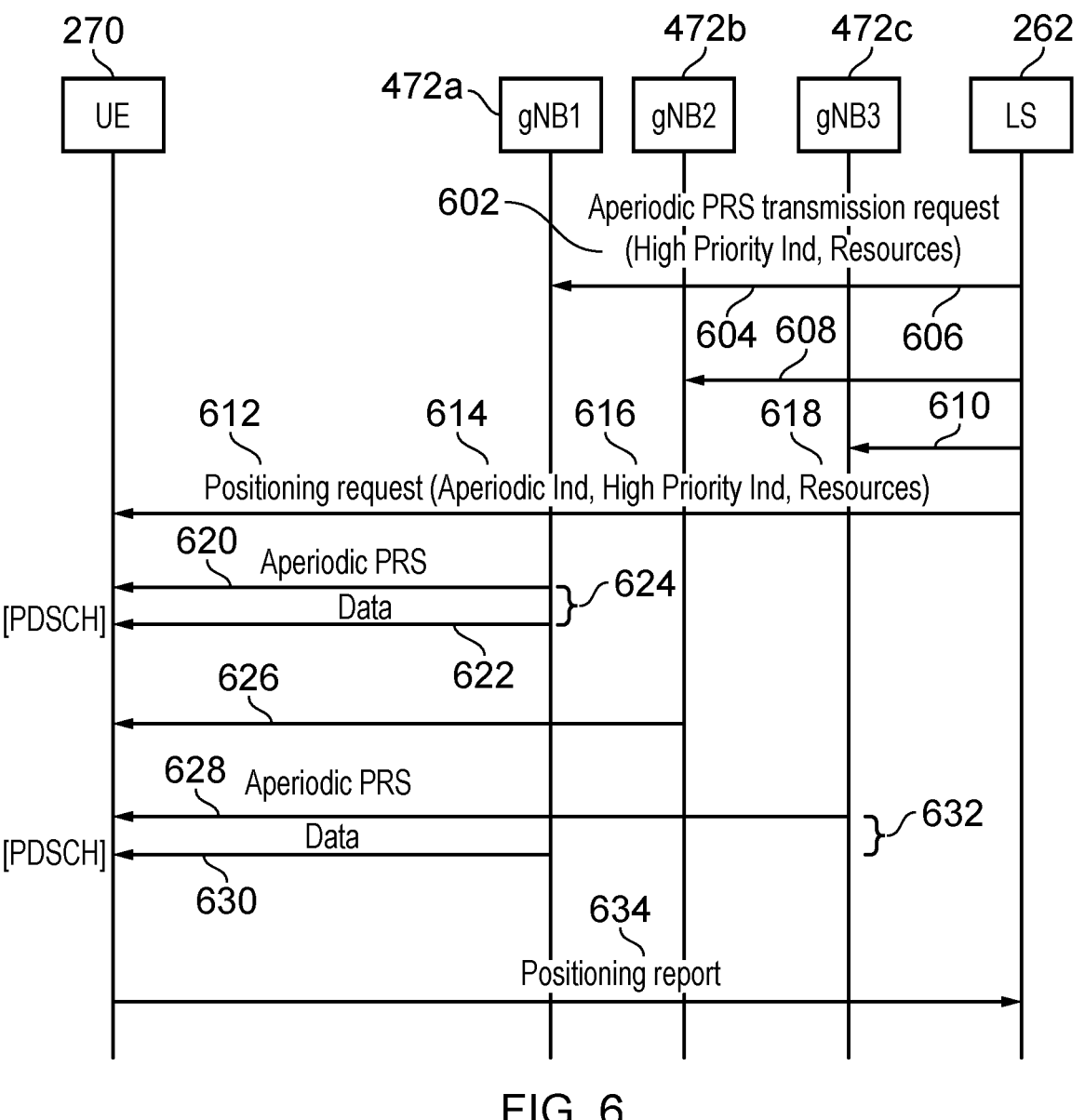
FIG. 6 is a message sequence chart for a positioning procedure in accordance with embodiments of the present technique.

FIG. 6 is a message sequence chart for a positioning procedure in accordance with embodiments of the present technique. Initially, the communications device 270 is located within a serving cell of a wireless communications network, the serving cell generated by the first infrastructure equipment 472a.

The communications device 270 is also in the geographic vicinity of second and third infrastructure equipment 472b, 472c.

As in the example of FIG. 4A, the first infrastructure equipment 472a is connected to the location server 262, and the location server 262 is also connected to second and third infrastructure equipment 472b, 472c.

In the example of FIG. 6, the location server 262 has determined (e.g. based on a request from another network entity, or from the communications device 270) that a positioning procedure in respect of the communications device 270 is required, and that the procedure is a high priority procedure. For example, the communications device 270 may have initiated a call to the emergency services and has accordingly requested a positioning procedure for the purposes of providing the emergency services with the location of the communications device 270.

In some embodiments, one or more of the first to third infrastructure equipment 472 may be transmitting periodic PRS. In the example of FIG. 6, the location server 262 determines that it is necessary to trigger aperiodic PRS for the present procedure, for example because a latency associated with using periodic PRS is too high, or because one or more of the first to third infrastructure equipment 472 is not transmitting periodic PRS.

Accordingly, the location server 262 initiates an aperiodic PRS location procedure. The initiation of this procedure may be broadly in accordance with techniques disclosed in [5]. In accordance with embodiments of the present technique, the location server 262 transmits an aperiodic PRS transmission request 602 to the first infrastructure equipment 472a. The aperiodic PRS transmission request 602 comprises a high priority indication 604 and a resource indication 606. The resource indication 606 indicates communication resources on a wireless access interface generated by the first infrastructure equipment 472a which are to be used by the first infrastructure equipment 472a for transmitting the aperiodic PRS. The aperiodic PRS transmission request 602 is an example of a positioning signal transmission/reception request.

The high priority indication 604 indicates that the aperiodic PRS are to be transmitted with high priority.

The location server 262 transmits second and third aperiodic PRS transmission requests 608, 610 to the second and third infrastructure equipment 472b, 472c, respectively. The second and third aperiodic PRS transmission requests 608, 610 may comprise similar contents to the first aperiodic PRS transmission request 602. Preferably, the resource indications in the aperiodic PRS transmission requests indicate non-conflicting communication resources. Conflicting communication resources may be those where, in accordance with a capability or a configuration of the communications device 270, the communications device is not able to receive and measure all signals transmitted on those communication resources.

In some embodiments, uplink and downlink communication resources may conflict because the communications device is configured to operate as, or is capable of operating only as, a half-duplex frequency division duplex (HD FDD) communications device, such that the communications device is not able to both transmit using the uplink communications resources and receive using the downlink communication resources. The conflicting resources in this example may be overlapping in time, or may be separated in time by an amount which is less than a predetermined duration which is required by the communications device to switch from a transmit mode of operation to a receive mode of operation, or vice versa.

In some embodiments, the communications device 270 is capable of receiving using more than one beam simultaneously. Accordingly, the communications device 270 may be capable of receiving PRS with one or more of the beams and signals transmitted using different resources with one or more other beams. In this way, the UE can perform spatial multiplexing of the PRS and other signals/channels. Accordingly, in some embodiments, the different resources which can be simultaneously received using different beams may not be conflicting resources. Similarly, uplink resources may not conflict if it is possible for the communications device 270 to transmit using the uplink resources using two or more different beams.

The location server 262 transmits a positioning request 612 to the communications device 270, via the first infrastructure equipment 472a, which is the serving infrastructure equipment of the communications device 270.

The positioning request 612 may comprise an aperiodic indication 614, which indicates that the positioning procedure is to be based on the reception of aperiodic PRS. The positioning request 612 may also comprise a high priority indication 616, which indicates that the positioning procedure is a high priority procedure. The positioning request 612 may further comprise a resources indication 618, which indicates the resources to be used by the first to third infrastructure equipment 472a-c for transmitting aperiodic PRS, consistent with the respective resource indications 606 transmitted to the infrastructure equipment.

In response to receiving the respective aperiodic PRS transmission requests 602, 608, 610, the infrastructure equipment 472 schedule the aperiodic PRS to be transmitted using the resources indicated in the resource indication 606.

Based on the high priority indication 604 (which may be present in the second and third aperiodic PRS transmission requests 608, 610), the respective infrastructure equipment determines that the aperiodic PRS are to be transmitted with high priority. Accordingly, the aperiodic PRS may be scheduled to pre-empt any transmissions already scheduled for the resources indicated by the corresponding resource indication (such as the first resource indication 606 in the case of the first infrastructure equipment 472a). That is, where an infrastructure equipment had already scheduled a transmission using the resources indicated by a resource indication, the infrastructure equipment transmits instead the aperiodic PRS.

Where the earlier scheduled transmission extends over resources which are not required for the transmission of the aperiodic PRS, the infrastructure equipment may in some embodiments transmit, using the resources which are not required for the transmission of the aperiodic PRS, signals associated with the earlier scheduled transmission which would have otherwise been transmitted using those resources. This may be referred to as 'puncturing'.

In some embodiments, the first infrastructure equipment 472a may not be aware of the identity of the communications device 270 which is the subject of the positioning procedure. In addition, or alternatively, in some embodiments, the first infrastructure equipment 472a may not be aware of the communication resources on which the PRS are to be transmitted by the second or third infrastructure equipment 472b, 472c.

Accordingly, the first infrastructure equipment 472a (being the serving infrastructure equipment of the communications device) may allocate communication resources for the transmission of data to or by the communications device 270, which conflict with communication resources on which the PRS are to be transmitted by one of the first to third infrastructure equipment 472a-c.

Examples of this are illustrated in FIG. 6 for aperiodic PRS, however it will be appreciated that the techniques disclosed herein may apply also to periodic PRS.

In the example of FIG. 6, the first infrastructure equipment 472a transmits first aperiodic PRS 620 using resources indicated by the resource indication 606. However, the first infrastructure equipment 472a has previously scheduled first downlink data 622 to be transmitted to the communications device 270 using resources of a physical downlink shared channel (PDSCH) which conflict with the resources used to transmit the first aperiodic PRS 620.

The conflict is indicated by the brace 624.

The conflict may arise because, for example, the first downlink data 622 was scheduled to be transmitted using some or all of the communication resources allocated for the first aperiodic PRS 620.

The allocation of the resources for the transmission of the first data 622 may be indicated to the communications device 270 by means of downlink control information (DCI) transmitted on a physical downlink control channel (PDCCH).

The communications device 270 determines the resources on which the first aperiodic PRS 620 are to be transmitted based on the positioning request 612, and determines the resources on which the first data 622 is to be transmitted, for example, based on the DCI.

The communications device 270 then determines that these resources are conflicting.

Based on the high priority indication 616, the communications device 270 determines that receiving the first aperiodic PRS has a higher priority than receiving the first downlink data 622. In response to determining that receiving the first aperiodic PRS has a higher priority than receiving the first downlink data 622, the communications device 270 controls its receiver to receive the first aperiodic PRS 620. The communications device 270 may perform measurements of the received first aperiodic PRS 620, which may be in accordance with conventional requirements for measuring PRS. For example, the communications device 270 may determine a time of arrival of the first aperiodic PRS 620. The communications device 270 may in some embodiments control its receiver to receive, in addition, signals associated with the first data 622 which are transmitted using resources which are not conflicting with the resources used for the first aperiodic PRS 620.

Subsequently, the second infrastructure equipment 472b transmits second aperiodic PRS 626 using resources indicated in the second aperiodic PRS transmission request 608. In the example of FIG. 6, there is no allocation of uplink or downlink communication resources for the communications device 270 which conflict with the resources used for the second aperiodic PRS 626, and accordingly, the communications device 270 controls its receiver to receive the second aperiodic PRS 626 and to perform any appropriate measurements (e.g. received signal strength, time of arrival) of the second aperiodic PRS 626.

In the example of FIG. 6, the communications device 270 determines that downlink PDSCH resources are allocated by the first infrastructure equipment 472a, for the transmission of second data 630, and that these resources conflict with the resources indicated (by the positioning request 612) as being allocated for the transmission of the third aperiodic PRS 628 by the third infrastructure equipment 472c. The conflict is indicated by the brace 632.

Based on the high priority indication 616, the communications device 270 determines that receiving the third aperiodic PRS 628 has a higher priority than receiving the second downlink data 630. As for the first downlink data 622, in response, the communications device 270 controls its receiver to receive the third aperiodic PRS 628. The communications device 270 may perform measurements of the received third aperiodic PRS 628. The communications device 270 may in some embodiments control its receiver to receive, in addition, signals associated with the second data 630 which are transmitted using resources which are not conflicting with the resources used for the third aperiodic PRS 628.

After receiving the first, second and third aperiodic PRS 620, 626, 628 and performing any required measurements (e.g. received signal strength, time of arrival or time difference of arrival), the communications device 270 transmits a positioning report 634 to the location server 626 via the first infrastructure equipment 472a. The positioning report 634 may comprise an indication of the results of the measurements of the aperiodic PRS.

The location server 626 may determine the location of the communications device 270 based on the results of the measurements, in accordance with conventional techniques (e.g. based on the principles of OTDOA, as described above). The determined location of the communications device 270 may be indicated to the communications device 270 or another entity in the wireless communications network (not shown in FIG. 6).

Accordingly, embodiments of the present technique can ensure that where a positioning procedure is to be carried out, the communications device 270 can determine a priority for receiving or transmitting reference signals associated with the procedure, relative to a priority for receiving or transmitting other signals. Accordingly, for example, where the location determining procedure is a high priority procedure (as in the example of FIG. 6), the communications device 270 may priorities the reception of positioning reference signals over the reception or transmission of other signals, where the other signals are transmitted using resources which conflict with those allocated for the transmission of the positioning reference signals.

It will be appreciated that in some embodiments, the positioning procedure (and the corresponding positioning signals) may have a lower priority. For example, where the positioning procedure is for a vehicle tracking application, a higher latency may be acceptable and the procedure may be indicated as being a low priority.

Accordingly, in some embodiments, the location server may transmit a low priority indication to the communications device 270 and the infrastructure equipment that the transmission or reception of signals for the positioning procedure has a low priority.

In some embodiments, an indication of priority may be implicit. For example, referring to the example of FIG. 6, in some embodiments, an absence of the high priority indication 604 or the high priority indication 616 may indicate implicitly that the positioning procedure and/or associated positioning signals are low priority. In some embodiments, an implicit indication may depend on the nature of the positioning signals. For example, in the absence of any contrary explicit indication, aperiodic PRS and/or uplink positioning signals may be considered to be high priority, while periodic PRS may be considered to be low priority.

In response to receiving such indications, the first infrastructure equipment may, for example, refrain from puncturing already-scheduled downlink transmissions which are scheduled using conflicting communication resources.

In response to receiving such indication, the communications device 270 may, for example, control its receiver or transmitter to receive or transmit signals associated with other data which is transmitted using resources which conflict with those allocated for the transmission of positioning reference signals.

In the example of FIG. 6, the signals associated with the positioning procedure are downlink PRS. In some embodiments, the positioning procedure may be based on the transmission by the communications device 270 of uplink positioning signals, such as SRS.

For the uplink positioning signals, one or more synchronisation or reference signals specified for device-to-device sidelink communication (such as in accordance with a conventional specification produced by 3GPP or other standards development organisation) can be used. For example, the uplink positioning signals can be sidelink channel state information reference signals (CSI-RS), sidelink primary synchronisation signals (PSS) or sidelink secondary synchronisation signals (SSS). Accordingly, in some embodiments, the communications device 270 controls its transmitter to selectively transmit uplink signals associated with a positioning procedure based on an indication of a priority associated with those signals (or with the procedure).

For example, where the communications device 270 receives an allocation of uplink communication resources for the transmission of data, and receives an indication of an allocation of uplink communication resources for the transmission of uplink positioning signals, it may determine that these resources are conflicting. In response to determining that the resources are conflicting, the communications device 270 may determine (in accordance with techniques disclosed herein, for example) that the transmission of the uplink positioning signals has a higher priority than the transmission of the data. Accordingly, the communications device 270 may control its transmitter to transmit the uplink positioning signals using the uplink communication resources for the transmission of these signals. The communications device may refrain from transmitting the data using the uplink communication resources allocated for the transmission of data, or may transmit the data using only that portion of the uplink communication resources allocated for the transmission of the data which does not conflict with the uplink communication resources allocated for the transmission of the uplink positioning signals.

Similarly, where an infrastructure equipment has already determined that uplink resources, which conflict with those indicated by the location server 262 for the transmission of uplink positioning signals, are to be allocated for an uplink transmission of other signals, the infrastructure equipment may determine whether to proceed with the allocation for the other signals, based on an indication of a priority associated with the uplink positioning signals.

In the example of FIG. 6, the conflicting communication resources are both downlink resources. However, in some embodiments, the conflicting communication resources may comprise uplink and downlink communication resources.

Accordingly, in some embodiments, the communications device 270 controls its transmitter to selectively transmit uplink signals, and controls its receiver to selectively receive downlink signals based on a determination of a relative priority of the conflicting communication resources. In some embodiments, this may comprise refraining from transmitting at all using allocated uplink communication resources, or refraining from receiving any signals transmitted on allocated downlink communication resources.

In the example of FIG. 6, the priority of the positioning signals is determined (by the communications device 270 and by the infrastructure equipment 472) based on an indication transmitted by the location server 262.

In some embodiments, the determination of the priority of the positioning signals (uplink or downlink) is determined in other manners.

For example, in some embodiments, the determination may be made based on the nature of the positioning procedure. For example, an aperiodic positioning procedure (that is, one in which the positioning signals are not transmitted periodically and continuously) may be associated with a high priority, and/or a periodic positioning procedure may be associated with a lower priority. In some embodiments, an explicit indication may take precedence over a predetermined prioritisation. For example, an aperiodic positioning procedure may have, by default (e.g. according to a standard) a low priority. However, the location server 626 may indicate explicitly that the procedure has a high priority, thereby overriding the default priority.

In some embodiments, in response to identifying a conflict, the communications device 270 may determine a priority associated with signals which are to be transmitted or received using communications resources which conflict with those to be used for the positioning signals.

Where the signals represent data or control information, they may be associated with a L1 priority, which may be indicated by the serving infrastructure equipment 472a in a resource allocation for the communication resources, for example in a DCI.

In some embodiments where there signals represent data, the priority may be determined based on a quality of service requirement associated with the data. For example, URLLC data may be associated with a high priority.

In some such embodiments, the communications device may determine a relative priority for the data and the positioning procedure based on a priority associated with the positioning procedure and a priority associated with the data.

In some embodiments, the determination may depend on whether the positioning signals are to be transmitted in the serving cell (i.e. by or to the serving infrastructure equipment) or in a neighbour (non-serving) cell.

Where the other signals are to represent data, this determination may be in accordance with predetermined rules, such as those shown in Table 1.

TABLE 1

| Example of predetermined rules | | |
|---|---|---|
| Priority associated with positioning procedure/resources for positioning signals | Priority associated with data | Relative priority determination |
| High (serving cell) | Any | Positioning signals have higher priority |
| Low | High (L1 priority = high, and/or URLLC data) | Data has higher priority |
| Low | Low | Positioning signals have higher priority |
| High (neighbour cell) | High (L1 priority = high, and/or URLLC data) | Data has higher priority |

In the example of FIG. 6, conflicts arise between resources allocated for the transmission of PRS, and resources allocated for the transmission of data. However, the present disclosure is not so limited, and in some embodiments, a conflict may arise in respect of any other signals which, in the absence of the PRS, would be received or transmitted by the communications device.

In some embodiments, there may arise a conflict between resources allocated for different positioning signals. For example, a conflict may arise between resources allocated for the (downlink) transmission of PRS, and resources allocated for an (uplink) transmission of SRS by the communications device. In a further example, a conflict may arise between resources allocated for the (downlink) transmission of PRS associated with an aperiodic positioning procedure, and resources allocated for periodic PRS.

In some embodiments, the conflict may arise with resources allocated for the transmission of reference signals which the communications device is configured to measure or transmit. For example, the reference signals may be CSI-RS or SRS.

In some embodiments, the conflict may arise between resources allocated for the positioning signals and resources allocated for the transmission of control information, such as information transmitted on a physical downlink control channel (PDCCH) and/or within resources assigned as a control resources set (CORESET).

As disclosed above, the relative priorities of the signals may be determined based on one or more of explicit indications associated with the resources or positioning procedure and predetermined rules.

Examples of such predetermined rules may include:
aperiodic PRS have higher priority than periodic PRS;
positioning signals have higher priority than other reference signals;
URLLC data has a higher priority than positioning signals;
positioning signals have higher priority than control signals transmitted on PDCCH or within a CORESET.

An explicit priority indication associated with either the positioning signals or the other signals (or their respective resources) may override a relative priority determined in accordance with a predetermined rule. For example, if a communications device is configured with a predetermined rule that URLLC data has a higher priority than positioning signals, and an indication of resources for positioning signals is received indicating that the positioning signals have high priority, then the communications device may determine that the positioning signals (and associated resources) have a higher relative priority than the resources allocated for URLLC data.

In some embodiments, in response to determining a conflict in respect of first and second uplink communication resources, the communications device 270 may transmit using both communication resources. For communication resources which are within both the first and second uplink communication resources, signals associated with the higher priority are transmitted. Accordingly, the lower priority signals may be 'punctured' by the higher priority signals.

For example, where the first and second uplink communication resources are allocated for the transmission of SRS and uplink data, respectively, and where the SRS are determined to have the higher relative priority, signals associated with the uplink data are transmitted using that portion (if any) of the second communication resources which are not also within the first communication resources. The SRS are transmitted using the first uplink communication resources.

In the example of FIG. 6, the positioning procedure makes use of aperiodic PRS. However, in some embodiments, the positioning procedure makes use of periodic PRS. In such embodiments, the infrastructure equipment 472 may transmit periodic PRS using resources in accordance with a schedule, the resources and schedule being known to the location server 262.

In some such embodiments, accordingly, the location server 262 may indicate to the communications device 270 in the positioning request 612 that the communications device 270 is to receive periodic PRS. The positioning request 612 may further comprise an explicit priority indication (as in the example of FIG. 6), and may comprise a resources indication 618 indicating the resources to be used for the transmission of periodic PRS. The aperiodic PRS transmission requests 602, 608, 610 may be omitted in such embodiments, and the aperiodic PRS 620, 626, 628 may be replaced by periodic PRS transmitted in accordance with the schedule.

In some such embodiments the resolution of the resulting conflicts 624, 632 may be as described above in respect of the example of FIG. 6.

Time Window for Positioning Signal Transmission or Reception

In the example of FIG. 6, the Aperiodic PRS transmission request 602 to the first infrastructure equipment 472a indicates, in the resources indication 606, communication resources which the first infrastructure equipment 472a is required to use for the transmission of aperiodic PRS 620.

However, it may be undesirable for the first infrastructure equipment 472a to transmit (and/or for the communications device 270 to receive) the aperiodic PRS 620 using the resources indicated by the resources indication 606. For example, the first infrastructure equipment 472a may have already allocated some or all of these resources for a URLLC data transmission or other high priority transmission. In another example, the first infrastructure equipment 472a may have allocated communication resources for the transmission or reception of data by the communications device 270, which conflict with those indicated by the resources indication 606.

In accordance with embodiments of the present technique, a resources set indication (and similar resources indications transmitted to the other infrastructure equipment 472b, 472c) may indicate a plurality of communication resources which may be used for the transmission of the positioning signals. The plurality of communication resources may be a periodic sequence of communication resources within a time window. In some embodiments, the time window may comprise a number of time slots of the wireless access interface. In some such embodiments, the periodicity of the plurality of communication resources may be equal to one time slot, such that the plurality of communication resources comprise resources in each of a sequence of time slots. Within each time slot, the communication resources may be the same, so that the resources set indication comprises an indication of a starting time slot, an ending time slot (or a duration of the time window) and an indication of the resources within a single time slot.

Figure 7:
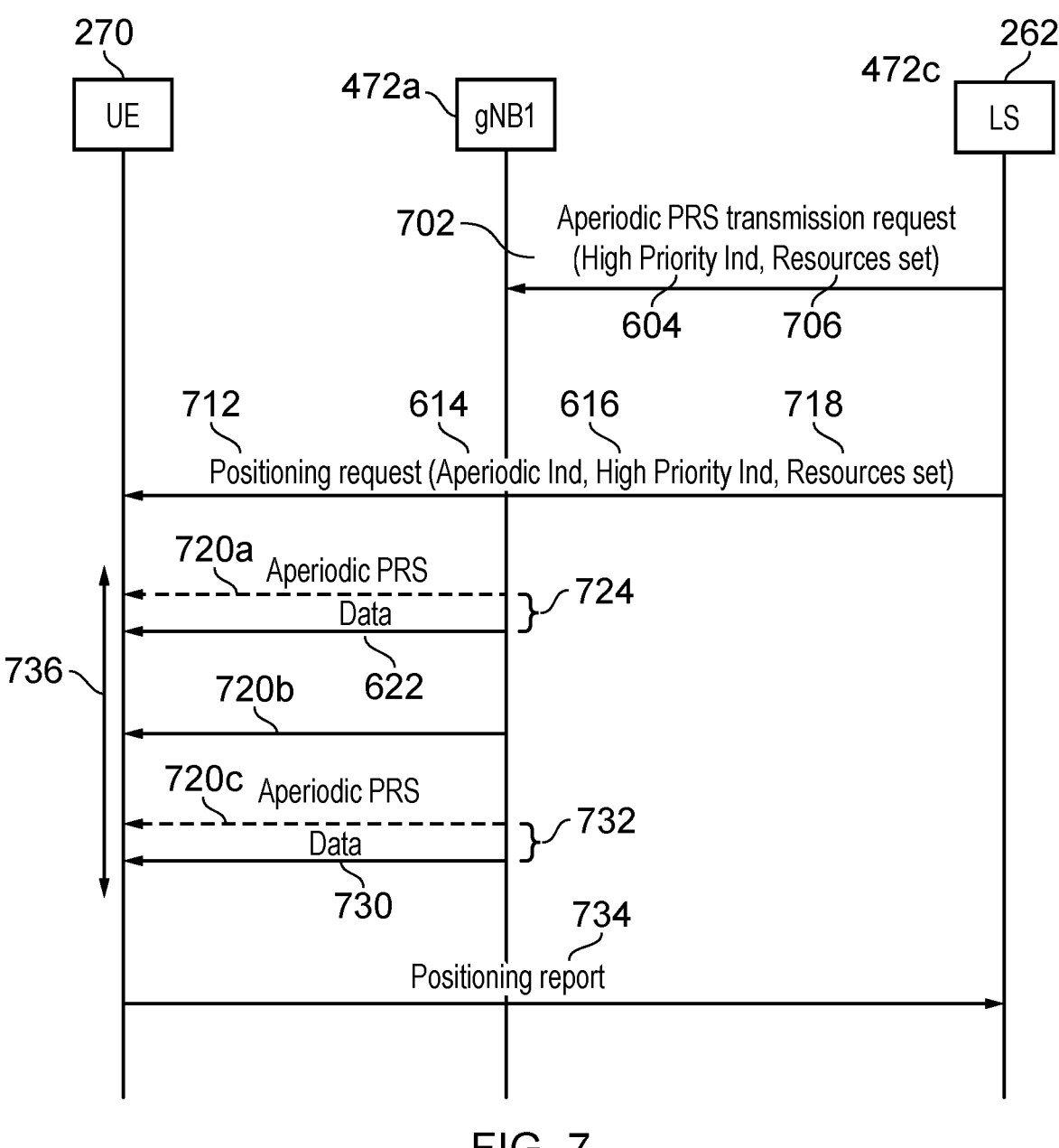
FIG. 7 is a message sequence chart illustrating an indication of a plurality of resources for the transmission of positioning signals, in accordance with embodiments of the present technique.

FIG. 7 shows a message sequence chart illustrating the indication of a plurality of resources for the transmission of positioning signals, in accordance with embodiments of the present technique.

In the example of FIG. 7, only the first infrastructure equipment 472a is shown, for clarity and conciseness. However, it will be appreciated that positioning signals may be transmitted from other infrastructure equipment.

Elements of FIG. 7 which have the same function as corresponding elements in FIG. 6 are numbered with like numerals, and their description will be omitted for conciseness.

As in the example of FIG. 6, the location server 262 transmits an aperiodic PRS transmission request 702 to the first infrastructure equipment 472a. However, the aperiodic PRS transmission request 702 comprises a resources set indication 706, which indicates a plurality of communication resources 720a, 720b, 720c which may be used for the transmission of PRS by the first infrastructure equipment 472a. In the example of FIG. 7, the plurality of communication resources 720a, 720b, 720c are periodic and occur within a time window 736. Accordingly, in some embodiments, the resources set indication 718 may comprise an indication of the time window 736. The aperiodic PRS transmission request 702 is an example of a positioning signal transmission/reception request.

As in the example of FIG. 6, the location server 262 transmits, via the first (serving) infrastructure equipment 472a, to the communications device 270, a positioning request 712. The positioning request 712 comprises a resources set indication 718, which indicates the communication resources corresponding to those indicated in the resource set indication 706 included in the aperiodic PRS transmission request 702. The resources set indication 718 in the positioning request 712 may also indicate resources which may be used by other infrastructure equipment (such as the infrastructure equipment 472b, 472c in the example of FIG. 6) to transmit PRS.

In response to receiving the aperiodic PRS transmission request 702, comprising the resources set indication 706, the first infrastructure equipment 472a determines which of the indicated resources 720a, 720b, 720c are to be used for transmitting the aperiodic PRS.

In the example of FIG. 7, the first infrastructure equipment 472a determines that it has already allocated some or all of first indicated resources 720a for a transmission (which may be to or by the communications device 270, or to or by another communications device in the cell). In the example of FIG. 7, the transmission is to the communications device 270, but it will be appreciated that the transmission may be to another communications device.

Accordingly, the first indicated resources 720a, and first previously-allocated resources 622 overlap, as indicated by the brace 724.

In the example of FIG. 7, the first infrastructure equipment 472a knows of the identity of the communications device 270 which is the subject of the positioning procedure. In other words, the first infrastructure equipment 472a is able to determine that the aperiodic PRS to be transmitted in response to the positioning request 712 are for measurement by the communications device 270 (and not, for example, by some other communications device).

In some embodiments, the positioning request 712 comprises a UE identity indication (not shown in FIG. 7), which identifies the communications device 270.

The infrastructure equipment 472a determines that, in respect of the third indicated resources 720c, for the communications device 270, these would be conflicting resources with resources 730, which the infrastructure equipment 472a has scheduled for the transmission of high priority data to the communications device 270.

Accordingly, the first infrastructure equipment 472a identifies a second conflict (indicated by the brace 732 in FIG. 7).

In response to identifying the overlap 724 and conflict 732 associated with the first and third indicated resources 720a, 720c, respectively, the first infrastructure equipment 472a selects the second indicated resources 720b for transmission of the aperiodic PRS.

In some embodiments, the first infrastructure equipment 472a selects one from the plurality of resources indicated in the aperiodic PRS transmission request 702 and transmits aperiodic PRS only on the selected resources.

In some embodiments, the first infrastructure equipment 472a transmits aperiodic PRS on a subset of the indicated resources, such that none of the subset overlap with, or conflict with other allocated communicated resources. For example, in some embodiments, the infrastructure equipment 472a may not detect the conflict 732 in the example of FIG. 7, because it is not aware of the identity of the communications device 270 which is involved in the positioning procedure. Accordingly, the infrastructure equipment 472a may transmit aperiodic PRS on both the second and third indicated resources 720b, 720c.

In some embodiments, the communications device 270 behaves, in respect of each indicated communication resource indicated in the resources set indication 718 of the positioning request 712, in accordance with the principles disclosed elsewhere herein for the case where only single communication resources are identified (such as in the example of FIG. 6). That is, for example, considering the second resources 720b, the communications device 270 may determine whether there is a conflict, and if not, may control its receiver to receive and measure the aperiodic PRS 720b. Where there is a conflict (as in the case of the third resources 720c) the communications device 270 determines whether to receive the aperiodic PRS or the data based on relative priorities associated with the aperiodic PRS and the data (or their respective communication resource allocations). The determination as to how or whether to receive and measure PRS may be made independently for each instance of communication resources on which PRS may be transmitted, as indicated by the resources set indication 718.

In some embodiments, the communications device 270 may accordingly (or otherwise) perform measurements in respect of multiple PRS transmitted by the same infrastructure equipment associated with the same positioning procedure.

In some embodiments, when generating a positioning report 734, the communications device 270 selects, for each infrastructure equipment, one of the multiple PRS transmitted by the infrastructure equipment and generates the positioning report 734 based on measurements associated with the selected PRS. In some embodiments, the selected PRS may be the one received with the highest signal strength, with the highest signal to noise ratio, or with the best correlation value.

In some embodiments, the communications device 270 generates the positioning report 734 based on measurements results associated with each measured PRS.

In some embodiments, the positioning report 734 comprises an indication of which PRS were measured by the communications device 270 and/or which PRS form the basis of the measurement report. In some embodiments, the positioning report 734 may comprise an indication of one or more of the multiple PRS transmitted by the infrastructure equipment which were not measured as a result of a conflict.

As described above, the communications device 270 may transmit a positioning report 734 which indicates measurements associated with multiple PRS transmitted by the same infrastructure equipment, such as the infrastructure equipment 472a.

However, it may be that one or more of these measurements may be associated with signals which are not PRS, because the infrastructure equipment did not in fact transmit PRS using resources on which those signals were transmitted. For example, in the example of FIG. 7, the communications device 270 may have performed and reported measurements associated with the first indicated resources 720a. However, as described above, the infrastructure equipment 472a may not have in fact transmitted any PRS using those resources, due to the overlap 724.

Accordingly, in some such embodiments, the serving infrastructure equipment 472a may process the positioning report 734 to remove measurement results associated with signals which were considered, incorrectly, by the communications device 270 to be PRS transmitted by the serving infrastructure equipment 472a.

Where a non-serving infrastructure equipment does not transmit PRS, for example, due to an overlap similar to the overlap 724, this may be indicated to the LS 262 which may process the positioning report 734 based on this indication.

In some embodiments, the communications device 270 may determine which measurement results (i.e. corresponding to which PRS) are to be included in the positioning report 734 based on signalling transmitted by the infrastructure equipment.

For example, the signalling may indicate which of the plurality of resources indicated in the resources set indication 718 were actually used by the infrastructure equipment 472a to transmit PRS. The communications device 270 may accordingly transmit measurement reports only for those PRS which were actually transmitted by the infrastructure equipment 472a, and which were measured by the communications device 270.

In some embodiments, the communications device 270 may transmit measurement reports only for those PRS which were actually transmitted by the infrastructure equipment 472a, and which were measured by the communications device 270.

In some embodiments, the communications device 270 may transmit measurement reports in respect of a predetermined maximum number of PRS. In some embodiments, the predetermined maximum number may be one.

In some embodiments, the signalling by the serving infrastructure equipment 472a may indicate which of the plurality of resources indicated in the resources set indication 718 were actually used by the serving infrastructure equipment 472a to transmit PRS may comprise an indication transmitted within DCI. In some embodiments, the DCI may also comprise an indication of uplink resources allocated for the transmission of the positioning report 734.

In the example of FIG. 7, the positioning signals are downlink PRS, transmitted by infrastructure equipment. In some embodiments, the resources indicated by the resources set indications 706, 718 are allocated for the transmission of uplink positioning signals, such as SRS, by the communications device 270.

In some such embodiments, the infrastructure equipment (which may be the serving infrastructure equipment 472a or a non-serving infrastructure equipment 472b, 472c) monitors each of the resources indicated by the resources set indications 706 and performs measurements for the positioning procedure of uplink positioning signals (e.g. SRS) transmitted using those resources.

In some embodiments, an infrastructure equipment may determine not to monitor for uplink positioning signals using one or more instances of the resources if it has allocated (or subsequently does allocate) those resources for high priority transmissions. Accordingly, in some embodiments, different infrastructure equipment may monitor different instances of the resources.

In some embodiments, the communications device 270 may select one or more of the resources indicated by the resources set indication 718 for transmitting the uplink positioning signals. The selected one or more resources may include all such resources for which there is no conflicting communication resource allocation, or where any conflicting communication resources are associated with a lower priority than the uplink positioning signals. The infrastructure equipment perform positioning measurement based on the received uplink positioning signals. Subsequently, a positioning measurement result is transmitted to the LS 262 by each of the infrastructure equipment 472.

In some embodiments, an infrastructure equipment may include, in the positioning measurement result, measurements associated with a subset of the resources indicated by the resources set indication.

For example, in some embodiments the infrastructure equipment sends a positioning measurement for signals received using one of the resources to the location server only if the received signal to noise ratio of those signals is above a threshold.

In some embodiments, the infrastructure equipment sends to the location server only the positioning measurement for signals received using one of the resources (e.g. that is received in a time window), the signals having the highest signal to noise ratio and/or the best quality measurement.

In some embodiments, the communications device may send uplink control information to the serving infrastructure equipment following the time window (or after the last of the resources indicated by the resources set indications 706, 718) indicating which uplink positioning signals it had transmitted. The serving infrastructure equipment 472a may send only positioning measurements to the location server 262 related to those positioning signals that the communications device 270 had indicated in the uplink control information as having been transmitted.

Infrastructure Equipment Indication to Communications Device

In some embodiments (and as in the examples of FIG. 6 and FIG. 7), the indication of communication resources on which positioning signals may be transmitted, and/or their associated priority, may be signalled to the communications device 270 by the location server 262.

In some embodiments, one or both of the communication resources on which positioning signals may be transmitted, and their associated priority, may be signalled to the communications device 270 by the serving infrastructure equipment 472a.

In some embodiments, for example, an infrastructure equipment may indicate a priority of communication resources allocated for the transmission of positioning signals by including a corresponding indication in a DCI. The indication may indicate a L1 priority associated with the communication resources. The DCI may indicate the allocated communication resources.

In another example, in some embodiments, the serving infrastructure equipment 472a may transmit a resource indication of one or more instances of communication resources which may be used for the transmission of aperiodic positioning signals. The resource indication may further comprise an indication of a priority associated with each of the instances.

The infrastructure equipment 472a may subsequently transmit an indication of one of the instances of the communication resources, for example, using DCI, that are allocated for the transmission of the positioning signals.

Figure 8:
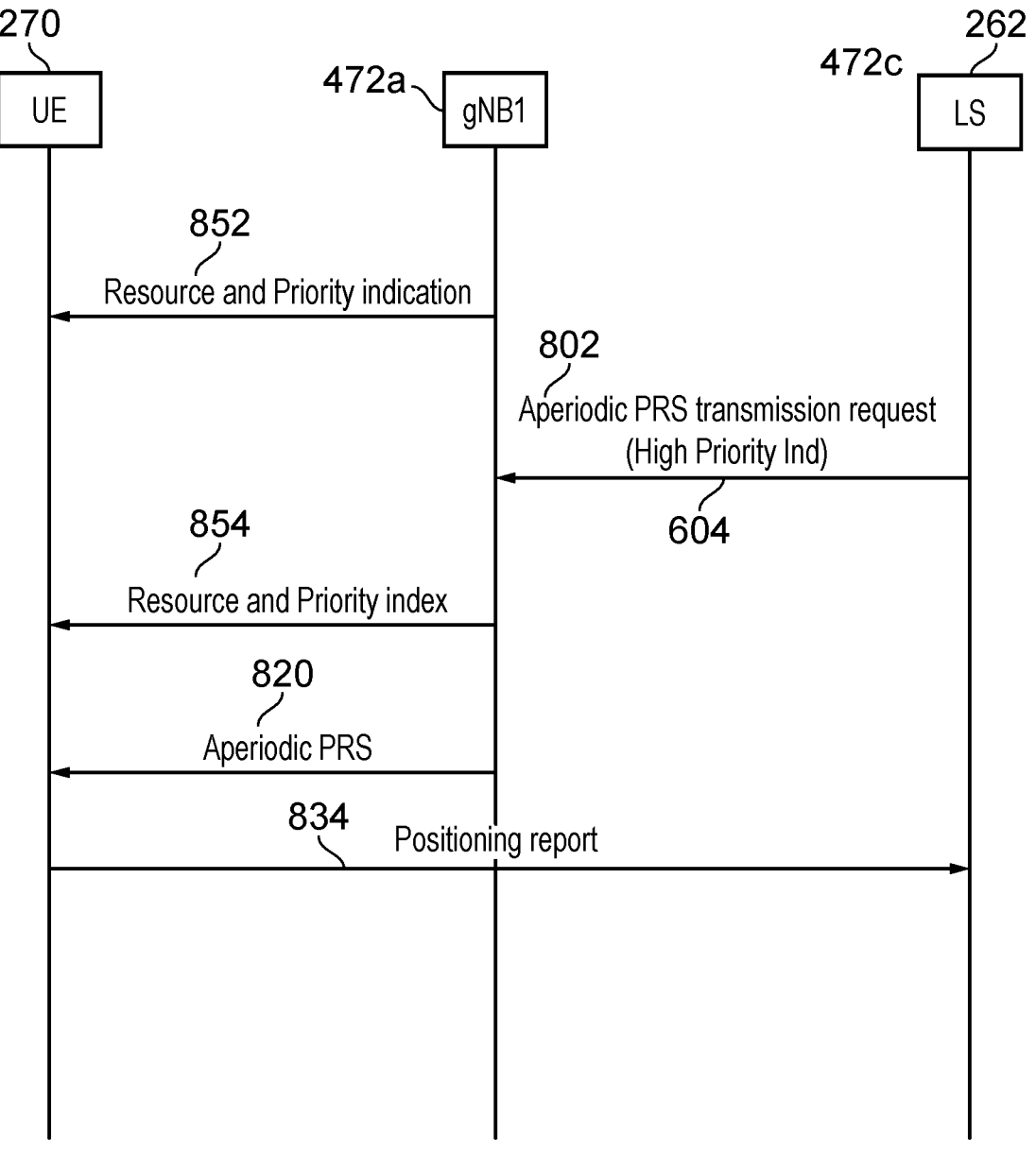
FIG. 8 is a message sequence chart showing the indication of communication resources for the transmission of positioning signals and associated priorities, in accordance with embodiments of the present technique.

FIG. 8 illustrates a message sequence chart for the indication of communication resources for the transmission of positioning signals and associated priorities, in accordance with embodiments of the present technique.

Initially, the serving infrastructure equipment 472a transmits a resource and priority indication 852. The resource and priority indication 852 may be transmitted in radio resource control (RRC) signalling. The resource and priority indication 852 may comprise an indication of a plurality of communication resource instances which may be subsequently allocated by the infrastructure equipment 472a for the transmission of positioning signals. The positioning signals may be uplink signals (in which case the resources may be uplink communication resources) or downlink signals (in which case the resources may be downlink communication resources).

The resources may subsequently be allocated dynamically, for example by means of DCI. Accordingly, the resource and priority indication 852 may characterise the resources as being located in the time domain at a time relative to a (future) DCI transmission.

The resource and priority indication 852 may indicate, for each of the plurality of communication resource instances, a priority associated with the resource instance. The plurality of communication resource instances may be indexed. In the example of FIG. 8, the information conveyed by the resource and priority indication 852 is shown in Table 2.

TABLE 2

| | Example of resource and priority indication | | | |
|---|---|---|---|---|
| Index | Resource (time) (symbols of the timeslot following the DCI, inclusive) | Resource (frequency, physical resource blocks, inclusive) | Priority | Signals |
| 1 | 1-3 | 12-23 | High | Downlink PRS |
| 2 | 4 | 1-23 | Low | Downlink PRS |
| 3 | 6-7 | 24-35 | Low | Downlink PRS |
| 4 | 4 | 1-23 | High | Uplink SRS |

In some embodiments, the information corresponding to one or more of the columns may not be present.

In some embodiments, the resource and priority indication 852 (or a further similar indication) may provide corresponding information in respect of resources and/or an associated priority for positioning signals transmitted by other infrastructure equipment, such as the non-serving infrastructure equipment 472b, 472c.

In some embodiments, the resources and/or an associated priority for positioning signals transmitted by other infrastructure equipment are indicated by the LS 262 to the communications device 270.

Subsequently, the location server 262 transmits an aperiodic PRS transmission request 802 to the serving infrastructure equipment 472a. The aperiodic PRS transmission request 802 may comprise an indication of the priority of the positioning procedure, such as the high priority indication 604. A corresponding aperiodic transmission request may be transmitted from the LS 262 to the other (non-serving) infrastructure equipment 472b, 472c.

In response to receiving the aperiodic PRS transmission request 802, the serving infrastructure equipment 472a determines the priority associated with the positioning procedure, and selects communication resources for the transmission of the relevant signals. In the example of FIG. 8, the positioning procedure is high priority, and uses downlink PRS as positioning signals. Accordingly, the infrastructure equipment 472a selects the resources associated with index 1 in Table 2, since these are known at the communications device 270 to be associated with a high priority and to be for the transmission of downlink PRS.

The serving infrastructure equipment 472a then transmits a resource and priority index indication 854, which indicates the index associated with the allocated resources, i.e. index 1 in the present example. The resource and priority index indication 854 may be transmitted within a DCI.

Consistent with the index indicated by the resource and priority index indication 854, the serving infrastructure equipment 472a then transmits downlink PRS using the resources corresponding to the index.

In response to receiving the resource and priority index indication 854, the communications device 270 determines the communication resources and associated priority to be used by the infrastructure equipment 472a for the transmission of downlink PRS 820.

In the example of FIG. 8, the resources are associated with a high priority, and accordingly the communications device 270 controls its receiver to receive the downlink PRS 820, irrespective of any conflicting resource allocation.

In other examples, the resources may be associated with a low priority, in which case the communications device 270 may determine whether conflicting communication resources are allocated to it, and if so, whether the relative priority of the downlink PRS is higher than or lower than that of the conflicting resources. The communications device 270 may then control its receiver based on the determined relative priorities, as described elsewhere herein.

Downlink PRS may additionally be transmitted by the other infrastructure equipment 472b, 472c. The communications device 270 may also perform measurements of the downlink PRS transmitted by the other infrastructure equipment 472b, 472c.

The communications device 270 may then form a positioning report comprising an indication of measurements taken in respect of the downlink PRS 820 and of other PRS received as part of the positioning procedure (such as those transmitted by other infrastructure equipment, not shown in FIG. 8). The communications resources and priorities associated with the other PRS may be determined based on an indication received from the location server 262, as described above in the context of FIG. 6 and FIG. 7.

In some embodiments, the DCI which comprises the resource and priority index indication 854 may also comprise an indication of the resources allocated for the transmission of the positioning report 834.

In some embodiments, the serving infrastructure equipment 472a may transmit an indication to the communications device 270 of communication resources used to transmit periodic PRS. The periodic PRS may be those transmitted in the current serving cell by the serving infrastructure equipment 472a and/or by other non-serving infrastructure equipment (such as the infrastructure equipment 472b, 472c). The serving infrastructure equipment 472a may have previously received an indication of the resources used for periodic PRS transmissions by the other non-serving infrastructure equipment, for example, from the LS 262.

The infrastructure equipment 472a may subsequently transmit a dynamic (e.g. via a DCI) instruction to the communications device 270 to monitor and measure subsequently transmitted periodic PRS. The instruction may indicate a priority associated with the periodic PRS. The dynamic instruction may be transmitted in response to receiving a positioning request from the LS 262. The positioning request may indicate the priority associated with the periodic PRS.

For example, periodic PRS may be transmitted with an 80 ms periodicity and hence transmitted at times 0, 80 ms, 160 ms, 240 ms, 320 ms. In an example, DCI signalling could specifically indicate (e.g. at time 78 ms) that the periodic PRS at time 80 ms (or the next upcoming PRS) have a high priority.

In another example a DCI may indicate that the priority of the periodic PRS is temporarily changed (e.g.) from low to high. A subsequently transmitted DCI may indicate that the priority of the periodic PRS is changed to low.

In some embodiments, an indication of communications resources and/or associated priorities for positioning signals may be transmitted to multiple communications devices. For example, an indication that PRS/SRS are of high priority can be sent via a group common DCI (GC-DCI). Embodiments of the present technique can thus permit more than one UE to determine its position with low latency. The GC-DCI can be sent in a common search space. In respect of downlink PRS, the GC-DCI can indicate which PRS Resource Set or PRS Resource ID of a PRS Resource Set are indicated as High priority.

In some embodiments, an indication associated with one or more instances of periodic PRS may be associated with a timer. The value of the timer may be predetermined or indicated in signalling. When the timer expires, the indicated PRS revert back to Low priority.

In some embodiments a GC-DCI activates the SRS transmission of multiple communications devices. The communications devices may be pre-configured with resources for the transmission of the High priority SRS and the GC-DCI may act as an activation to trigger the SRS transmission.

In an embodiment, the indication that the PRS/SRS are of high priority can be sent in a DCI that is encoded with an identifier associated with positioning signals, for example by using a "Positioning radio network temporary identifier (RNTI)". In some embodiments, a DCI using a 'Positioning RNTI' is sent in a common search space.

Resources for conventional periodic PRS using a 3GPP NR wireless access interface may be arranged within PRS resource sets. A PRS Resource Set may define how one or more PRS Resources is transmitted [7]. There can be one or more PRS Resources in a PRS Resource Set, where each PRS Resource may comprise:

PRS Resource ID: ID of the PRS Resource within a PRS Resource Set

PRS Sequence: Pseudo random generation of the sequence used for the PRS Resource PRS Slot Offset $O_{slot}$: The starting slot of the PRS Resource relative to the start of the PRS Resource Set period PRS Symbol Offset $O_{symbol}$: The starting symbol of the PRS Resource relative to the start of the slot boundary Duration of PRS Resource $L_{PRS}$: The duration of each PRS transmission in number of symbols, where $L_{PRS}=$ (2, 4, 6, 12) symbols [7]

Start physical resource block (PRB): The start of the PRS Resource in frequency domain Accordingly, resources within a set share a common numerology.

The PRS resource can be represented with a resource ID. The resource ID in this context may also be associated with a beam ID. A set of PRS resources with the same configuration (including the same numerology) can be represented with a set ID and may be referred to as a PRS resource set. A base-station can be configured with multiple resource sets.

In accordance with some embodiments of the present technique, a subset of PRS Resource of a PRS Resource Set may be configured (e.g. by means of RRC signalling) to have a particular priority, for example a high priority. In some embodiments, a PRS Resource Set can be configured to have a particular priority, e.g. a high priority.

Figure 9:
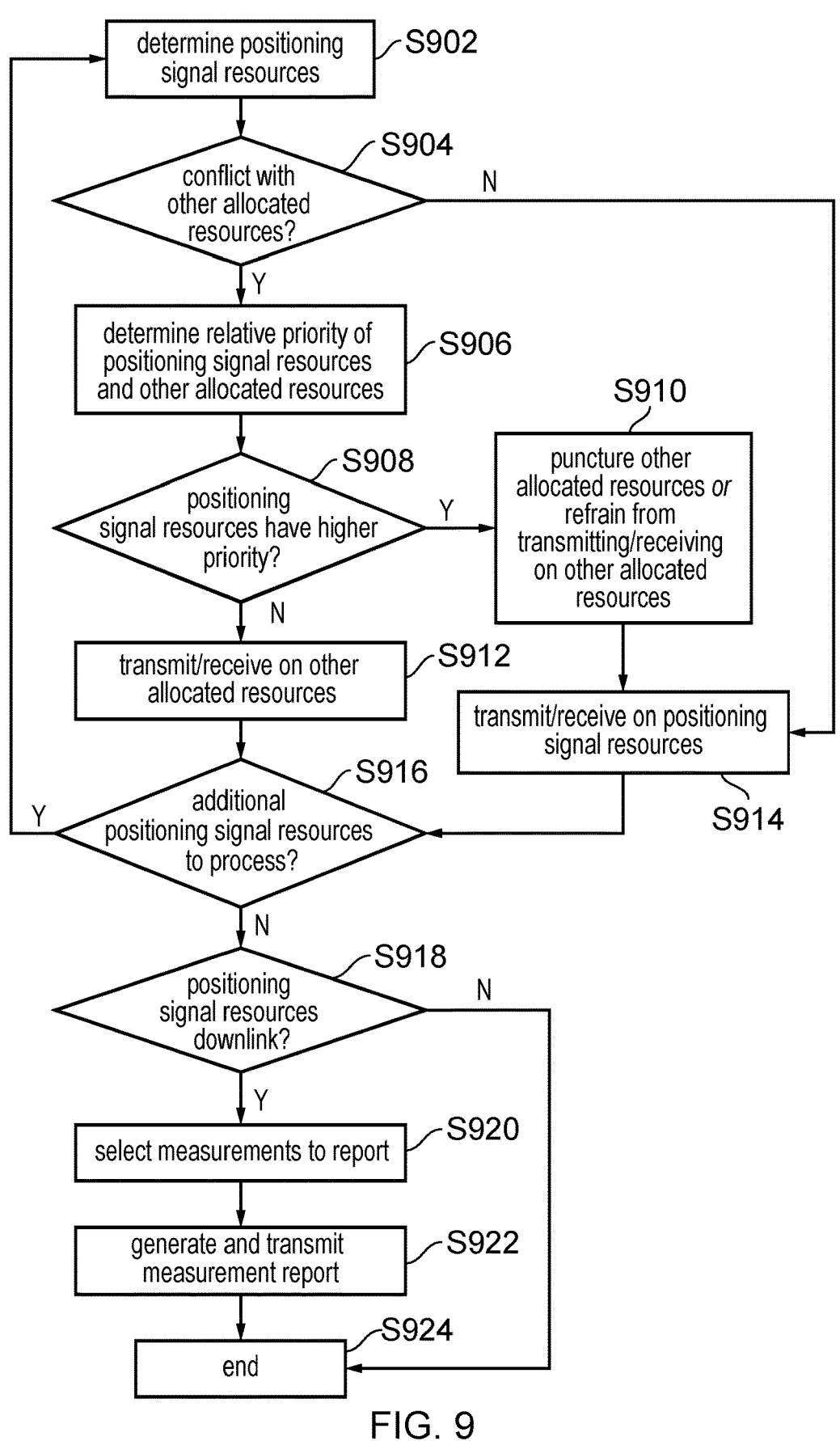
FIG. 9 is a flow chart for a process which may be carried out by a communications device in accordance with embodiments of the present technique

FIG. 9 is a flow chart for a process which may be carried out by a communications device, such as the communications device 270, in accordance with embodiments of the present technique.

The process starts at step S902, in which the communications device 270 determines positioning signal resources, which are allocated for the transmission of positioning signals to or by the communications device. As described above, this determination may be based on an indication received from a location server, or from a serving infrastructure equipment. The positioning signals may be PRS, SRS, or any other suitable signal. The resources may be uplink resources or downlink resources of a wireless access interface provided by an infrastructure equipment.

At step S904, the communications device 270 determines whether the positioning signal resources conflict with other communication resources which have been allocated for the transmission of signals to or by the communications device. These may conflict, for example, because they are overlapping in time, or overlapping in both time and frequency. The other communication resources may be allocated for the transmission or reception of data. The data may be associated with a URLLC service or an eMBB service.

In some embodiments, the other communication resources may have been allocated for the transmission of reference signals. The communications device 270 may receive (or have already received) an indication instructing the communications device to measure reference signals transmitted by an infrastructure equipment using the other communication resources. The reference signals may be for example, CSI-RS.

In some embodiments, the communications device 270 may receive (or have already received) an indication instructing the communications device to transmit reference signals using the other communication resources. In some embodiments, the reference signals may be aperiodic SRS. The reference signals may be for the purposes of channel sounding. In some embodiments, the reference signals to be transmitted using the other communication resources may be not suitable to be used as positioning signals. For example, positioning signals may be required to be transmitted over a minimum bandwidth or to have a minimum density, not satisfied by the reference signals to be transmitted using the other communication resources.

In some embodiments, the other communication resources may have been allocated for the transmission of control information. For example, in some embodiments, the other resources are assigned as a CORESET for the communications device, defining when the communications device is to monitor transmissions on a PDCCH.

If at step S904, it is determined that the positioning signal resources do not conflict with other allocated resources ('N'), then control passes to step S914. If it is determined that the positioning signal resources conflict with other allocated resources, control passes to step S906.

At step S906, the communications device 270 determines relative priorities of the positioning signal resources and the other allocated resources. This may be based on, for example, one or more of a L1 priority associated with either or both of the resources, a nature (e.g. periodic or aperiodic) of the positioning signals, an explicit indication from a location server, a pre-configured priority associated with the positioning signal resources, a type of service (e.g. URLLC) for which the other resource are allocated. Thus, the relative priorities may be determined based on preconfigured rules, explicit indications, or a combination of these.

If, at step S906, it is determined that the positioning signal resources do not have a higher priority than the other allocated resources ('N'), then control passes to step S912. At step S912, the communications device 270 transmits or receives using the other allocated resources. This may be in accordance with any conventional techniques. Control then passes to step S916.

If, at step S908, it is determined that the positioning signal resources have a higher priority than the other allocated resources ('Y'), then control passes to step S910. At step S910, the communications device 270 may in some embodiments, refrain from transmitting or receiving at all using the other allocated resources. In some embodiments, the communications device may transmit or receive using the other allocated resources, to the extent that it does not prevent the communications device 270 from transmitting or receiving using the positioning signal resources. Control then passes to step S914.

At step S914, the communications device 270 transmits or receives the positioning signals using the positioning signal resources. If the positioning signals are downlink signals, the communications device may measure aspects of these signals, such as time of arrival, offset time of arrival (relative to other received signals), and/or signal strength. Control then passes to step S916.

At step S916, the communications device 270 determines whether there are more positioning signal resources to process. For example, there may be positioning signal resources to process associated with transmissions to or by other infrastructure equipment. Additionally or alternatively, a plurality of positioning signal resources may have been allocated to the communications device for the purposes of a positioning procedure, as described above and illustrated in FIG. 7.

If there are more positioning signal resources to process, then control returns to step S902. If there are no further positioning signal resources to process, then control passes to step S918.

At step S918, if the positioning signal resources were downlink resources (i.e. allocated resources for the transmission of positioning signals by infrastructure equipment), then control passes to step S920. If the positioning signal resources were uplink resources (i.e. allocated resources for the transmission of positioning signals by the communications device), then control passes to step S924 and the process ends.

At step S920, the communications device selects positioning signals whose measurements are to be reported to the network (e.g. to a location server). In some embodiments, this step may be skipped if measurements are to be reported in respect of all received positioning signals. In some embodiments, this determination may be based on signalling by an infrastructure equipment. For example, as described herein, where a plurality of positioning signal resources have been allocated to the communications device for the purpose of receiving PRS, the infrastructure equipment may subsequently transmit an indication of a subset of those resources which were not used for the transmission of PRS, and/or where signals received on such resources should not (for some reason) be reported. After step S920, control passes to step S922.

At step S922, the communications device generates and transmits a measurement report comprising reports of the selected measurement, which were selected at step S920 or, in some embodiments, of all measurements. Control passes to step S924 and the process ends.

In a corresponding process that may be carried out by an infrastructure equipment of the wireless communications network, the infrastructure equipment may perform one or more of the following steps:

receive a positioning signal transmission/reception request from the location server 262; examples of a positioning signal transmission/reception request includes the aperiodic PRS transmission requests 602, 702, 802 described above.

transmit or receive positioning signals in accordance with an indicated or determined priority associated with the positioning signals;

for uplink positioning signals, perform measurements of the received positioning signals and transmit a positioning report comprising an indication of the measurements;

for downlink positioning signals where the infrastructure equipment is the serving infrastructure equipment for the communications device, receive a positioning report from the communications device.

In some embodiments, the positioning report is forwarded to the location server. In some embodiments, as described above, the positioning report may be modified based on a subset of resources used by the infrastructure equipment for transmitting the positioning signals.

These steps may be modified in accordance with any of the techniques disclosed herein.

There have been disclosed herein various techniques and process steps by means of various examples. The scope of the present disclosure is not, however, limited to these specific combinations of steps and techniques. In some embodiments, one or more steps may be modified or omitted, and steps may be performed in a different order from that shown or described above. In message sequence charts, time progresses from top to bottom, but this is not to scale.

For example, where examples described herein refer to aperiodic PRS, in some embodiments, the PRS may be periodic. Similarly, where positioning signals are referred to as downlink signals, in some embodiments, the positioning signals may be uplink signals.

In some examples, one or more indications have been transmitted within one or more particular messages. However, the mapping of indications to messages may be varied. For example, in some embodiments, two indications which are described herein as being transmitted within a single message may be transmitted within separate messages, or vice versa.

Thus there has been described a method of operating a communications device in a wireless communications network, the method comprising determining first positioning signal resources, the first positioning signal resources comprising communication resources allocated for transmission or reception by the communications device of positioning signals associated with a positioning procedure, determining other communication resources allocated for transmission or reception by the communications device of other signals, determining that the communications device cannot use both the first positioning signal resources for the transmission or reception of the positioning signals and the other communication resources for the transmission or reception of the other signals, determining relative priorities of the first positioning signal resources and the other communication resources, and based on the relative priorities, controlling a transmitter or receiver of the communications device to transmit or receive the positioning signals using the first positioning signal resources or to transmit or receive the other signals using the other communication resources.

There has also been described a method of operating a location server in a wireless communications network, the method comprising transmitting to an infrastructure equipment of the wireless communications network a positioning signal transmission/reception request to transmit or receive positioning signals, the positioning signal transmission/reception request comprising an indication of a priority associated with the positioning signals.

There has also been described a method of operating an infrastructure equipment in a wireless communications network, the method comprising receiving a positioning signal transmission/reception request to transmit or receive positioning signals, the positioning signal transmission/reception request comprising an indication of a priority associated with the positioning signals.

Corresponding apparatus, circuitry and computer readable media have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches can be applied in respect of any type of communications device operating with a wireless link to the communication network which supports a positioning procedure relying on the transmission and/or reception of signals by the communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device in a wireless communications network, the method comprising determining first positioning signal resources, the first positioning signal resources comprising communication resources allocated for transmission or reception by the communications device of positioning signals associated with a positioning procedure, determining other communication resources allocated for transmission or reception by the communications device of other signals, determining that the communications device cannot use both the first positioning signal resources for the transmission or reception of the positioning signals and the other communication resources for the transmission or reception of the other signals, determining relative priorities of the first positioning signal resources and the other communication resources, and based on the relative priorities, controlling a transmitter or receiver of the communications device to transmit or receive the positioning signals using the first positioning signal resources or to transmit or receive the other signals using the other communication resources.

Paragraph 2. A method according to paragraph 1, wherein the relative priority of the first positioning signal resources is higher than the relative priority of the other communication resources, the method comprising transmitting or receiving the first signals associated with the positioning procedure using the first communication resources, and refraining from transmitting or receiving the other signals using the other communication resources.

Paragraph 3. A method according to paragraph 1 or paragraph 2, wherein the other signals are associated with data.

Paragraph 4. A method according to paragraph 3, wherein the data is enhanced mobile broadband (eMBB) data.

Paragraph 5. A method according to paragraph 1 or paragraph 2, wherein the other signals are reference signals.

Paragraph 6. A method according to paragraph 5, wherein the reference signals are periodic positioning reference signals.

Paragraph 7. A method according to paragraph 5, wherein the reference signals are channel state information reference signals or sounding reference signals not associated with a positioning procedure.

Paragraph 8. A method according to paragraph 1 or paragraph 2, wherein the other signals are associated with control information and the other communication resources comprise resources of a control channel.

Paragraph 9. A method according to paragraph 1, wherein the other signals are associated with ultra-reliable low latency communications (URLLC) data, and the relative priority of the first positioning signal resources is lower than the relative priority of the other communication resources, the method comprising transmitting or receiving the other signals associated with the URLLC data using the other communication resources, and refraining from transmitting or receiving the positioning signals using the first positioning signal resources.

Paragraph 10. A method according to any of paragraphs 1 to 9, wherein the other resources are on a shared channel of a wireless access interface.

Paragraph 11. A method according to any of paragraphs 1 to 10, wherein the positioning signals are positioning reference signals (PRS) transmitted by an infrastructure equipment of the wireless communications network, and the first positioning signal resources are allocated for the reception by the communications device of the positioning signals.

Paragraph 12. A method according to any of paragraphs 1 to 10, wherein the positioning signals are sounding reference signals (SRS) and the first positioning signal resources are allocated for the transmission by the communications device of the positioning signals.

Paragraph 13. A method according to any of paragraphs 1 to 12, wherein determining the first positioning signal resources comprises receiving a positioning request from a location server in a core network of the wireless communications network, the positioning request comprising an indication of the first positioning signal resources.

Paragraph 14. A method according to any of paragraphs 1 to 13, the method comprising receiving an indication of a priority associated with the positioning signals or the first positioning signal resources, and wherein the relative priorities of the first positioning signal resources and the other communication resources are determined based on the priority associated with the positioning signals or the first positioning signal resources.

Paragraph 15. A method according to paragraph 14, wherein the indication of the priority is received from the infrastructure equipment.

Paragraph 16. A method according to paragraph 15, the method comprising receiving downlink control information (DCI), the DCI comprising the indication of the priority.

Paragraph 17. A method according to paragraph 16, the method comprising receiving a resource and priority indication, the resource and priority indication indicating a plurality of resources, wherein the DCI comprises an indication of one of the plurality of resources and the determining the first positioning signal resources is based on the indication of the one of the plurality of resources.

Paragraph 18. A method according to any of paragraphs 14 to 17, wherein the indication of the priority is received from the infrastructure equipment.

Paragraph 19. A method according to any of paragraphs 1 to 18, the method comprising receiving an indication of a plurality of positioning signal resources including the first positioning signal resources and for each one of the plurality of positioning signal resources other than the first positioning signal resources, determining whether other communication resources are allocated to the communications device such that, in accordance with the configuration or the capability of the communications device, the communications device cannot use both the one of the plurality of positioning signal resources for the transmission or reception of positioning signals and the other communication resources for the transmission or reception of other signals, and if so, based on relative priorities of the one of the plurality of positioning signal resources and the other communication resources, selectively controlling a transmitter or receiver of the communications device to transmit or receive positioning signals using the one of the plurality of positioning signal resources.

Paragraph 20. A method according to paragraph 19, wherein for at least one of the plurality of positioning signal resources other than the first positioning signal resources, selectively controlling a transmitter or receiver of the communications device to transmit or receive positioning signals using the one of the 50 plurality of positioning signal resources comprises controlling the transmitter or the receiver of the communications device to refrain from transmitting or receiving the positioning signals.

Paragraph 21. A method according to paragraph 19 or paragraph 20, wherein the plurality of positioning signal resources comprise a periodic sequence of communication resources within a time window.

Paragraph 22. A method according to any of paragraphs 1 to 21, wherein the first positioning signal resources are an instance of a sequence of periodic positioning reference signals which are transmitted continuously by an infrastructure equipment.

Paragraph 23. A method according to any of paragraphs 1 to 22, wherein the communications device is configured to operate in a half-duplex frequency division duplex (HD-FDD) mode, and wherein determining that the communications device cannot use both the first positioning signal resources for the transmission or reception of the positioning signals and the other communication resources for the transmission or reception of the other signals comprises determining that one of the first positioning signal resources and the other communication resources are uplink resources, the other one of the first positioning signal resources and the other communication resources are downlink resources, and the first positioning signal resources and the other communication resources overlap in time.

Paragraph 24. A method according to any of paragraphs 1 to 23, wherein determining that the communications device cannot use both the first positioning signal resources for the transmission or reception of the positioning signals and the other communication resources for the transmission or reception of the other signals comprises determining that the first positioning signal resources comprise a portion of the other communication resources.

Paragraph 25. A method of operating a location server in a wireless communications network, the method comprising transmitting to an infrastructure equipment of the wireless communications network a positioning signal transmission/reception request to transmit or receive positioning signals, the positioning signal transmission/reception request comprising an indication of a priority associated with the positioning signals.

Paragraph 26. A method according to paragraph 25, wherein the infrastructure equipment provides a wireless access interface in a serving cell of a communications device.

Paragraph 27. A method according to paragraph 25 or paragraph 26, wherein the positioning signals are downlink positioning signals to be transmitted by the infrastructure equipment for measurement by a communications device.

Paragraph 28. A method according to paragraph 25 or paragraph 26, wherein the positioning signals are uplink positioning signals to be transmitted by a communications device and measured by the infrastructure equipment.

Paragraph 29. A method according to any of paragraphs 25 to 28, the method comprising transmitting to the infrastructure equipment an indication of communication resources for the transmission of the positioning signals.

Paragraph 30. A method according to paragraph 29, wherein the indication of communication resources for the transmission of the positioning signals comprises an indication of a plurality of instances of communication resources.

Paragraph 31. A method according to any of paragraphs 25 to 30, the method comprising determining that a positioning procedure is required in respect of a communications device, and determining a priority associated with the positioning procedure, wherein transmitting to an infrastructure equipment of the wireless communications network the positioning signal transmission/reception request is in response to the determining that the positioning procedure is required in respect of the communications device and the priority associated with the positioning signals is based on the priority associated with the positioning procedure.

Paragraph 32. A method according to any of paragraphs 25 to 31, the method comprising receiving from the infrastructure equipment a positioning report, the positioning report comprising measurement results obtained from measuring the positioning signals, and determining a location of the communications device based on the measurement results.

Paragraph 33. A method of operating an infrastructure equipment in a wireless communications network, the method comprising receiving a positioning signal transmission/reception request to transmit or receive positioning signals, the positioning signal transmission/reception request comprising an indication of a 50 priority associated with the positioning signals.

Paragraph 34. A method according to paragraph 33, wherein the infrastructure equipment provides a wireless access interface in a cell, the method comprising transmitting to a communications device an indication of resources for the transmission of the positioning signals, the cell being a serving cell of the communications device, and transmitting to the communications device an indication of the priority associated with the positioning signals.

Paragraph 35. A method according to paragraph 34 wherein the indication of communication resources for the transmission of the positioning signals comprises an indication of a plurality of instances of communication resources.

Paragraph 36. A method according to paragraph 35, the method comprising determining that a portion or all of one of the plurality of instances of communication resources has been allocated for transmission of signals in the cell, and in response, refraining from transmitting or receiving the positioning signals using the one of the plurality of instances of communication resources.

Paragraph 37. A method according to any of paragraphs 33 to 36, wherein the positioning signals are uplink signals, the method comprising measuring the positioning signals in accordance with the priority associated with the positioning signals, and transmitting to a location server a positioning report, the positioning report comprising measurement results obtained from measuring the positioning signals.

Paragraph 38. A method according to paragraph 35, wherein the one of the plurality of instances of communication resources is for downlink transmission of positioning signals, the method comprising transmitting an indication to the communications device that the infrastructure equipment refrained from transmitting the positioning signals using the one of the plurality of instances of communication resources.

Paragraph 39. A method according to paragraph 36, paragraph 38 or paragraph 39, wherein the one of the plurality of instances of communication resources is for downlink transmission of positioning signals, the method comprising receiving a positioning report transmitted by the communications device, the positioning report comprising indications of measurements by the communications device of signals transmitted using one or more of the plurality of instances of communication resources, modifying the positioning report in response to the determining that a portion or all of one of the plurality of instances of communication resources has been allocated for transmission of signals in the cell and transmitting the modified positioning report to the location server.

Paragraph 40. A method according to paragraph 36, paragraph 38 or paragraph 39, wherein the one of the plurality of instances of communication resources is for downlink transmission of positioning signals, the method comprising receiving a positioning report transmitted by the communications device, the positioning report comprising indications of measurements by the communications device of signals transmitted using the resources for the transmission of the positioning signals, transmitting the positioning report to the location server.

Paragraph 41. A method according to any of paragraphs 33 to 40, wherein the indication of the resources for the transmission or reception of the positioning signals and the indication of the priority associated with the positioning signals are included within one or more downlink control information transmissions.

Paragraph 42. A method according to paragraph 41, the method comprising transmitting to the communications device a resource and priority indication comprising an indication of a plurality of communication resources, wherein the indication of the resources for the transmission or reception of the positioning signals comprises an indication of one of the plurality of communication resources.

Paragraph 43. A method according to paragraph 42, wherein the resource and priority indication comprises an indication of a priority associated with each of plurality of communication resources.

Paragraph 44. A communications device for operating in a wireless communications network, the communications device comprising a transmitter configured to transmit signals on a wireless access interface provided by an infrastructure equipment of the wireless communications network, a receiver configured to receive signals on the wireless access interface, and a controller configured to control the transmitter and the receiver so that the wireless communications device is operable: to determine first positioning signal resources, the first positioning signal resources comprising communication resources allocated for transmission or reception by the communications device of positioning signals associated with a positioning procedure, to determine other communication resources allocated for transmission or reception by the communications device of other signals, to determine that the communications device cannot use both the first positioning signal resources for the transmission or reception of the positioning signals and the other communication resources for the transmission or reception of the other signals, to determine relative priorities of the first positioning signal resources and the other communication resources, and based on the relative priorities, to transmit or receive the positioning signals using the first positioning signal resources or to transmit or receive the other signals using the other communication resources.

Paragraph 45. Circuitry for a communications device for operating in a wireless communications network, the circuitry comprising transmitter circuitry configured to transmit signals on a wireless access interface provided by an infrastructure equipment of the wireless communications network, receiver circuitry configured to receive signals on the wireless access interface, and controller circuitry configured to control the transmitter circuitry and the receiver circuitry so that the wireless communications device is operable: to determine first positioning signal resources, the first positioning signal resources comprising communication resources allocated for transmission or reception by the communications device of positioning signals associated with a positioning procedure, to determine other communication resources allocated for transmission or reception by the communications device of other signals, to determine that the communications device cannot use both the first positioning signal resources for the transmission or reception of the positioning signals and the other communication resources for the transmission or reception of the other signals, to determine relative priorities of the first positioning signal resources and the other communication resources, and based on the relative priorities, to transmit or receive the positioning signals using the first positioning signal resources or to transmit or receive the other signals using the other communication resources.

Paragraph 46. Infrastructure equipment for use in a wireless communications network, the infrastructure equipment providing a wireless access interface, the infrastructure equipment comprising a transmitter configured to transmit signals via the wireless access interface, a receiver configured to receive signals, and a controller configured to control the transmitter and the receiver so that the infrastructure equipment is operable to receive a positioning signal transmission/reception request to transmit or receive positioning signals, the positioning signal transmission/reception request comprising an indication of a priority associated with the positioning signals.

Paragraph 47. Circuitry for infrastructure equipment for use in a wireless communications network, the infrastructure equipment providing a wireless access interface, the circuitry comprising transmitter circuitry configured to transmit signals via the wireless access interface, receiver circuitry configured to receive signals, and controller circuitry configured to control the transmitter circuitry and the receiver circuitry so that the infrastructure equipment is operable to receive a positioning signal transmission/reception request to transmit or receive positioning signals, the positioning signal transmission/reception request comprising an indication of a priority associated with the positioning signals.

Paragraph 48. A location server for use in a wireless communications network, the location server comprising a processor, and a non-volatile memory having stored thereon instruction which, when executed by the processor, cause the location server to execute the step of transmitting to an infrastructure equipment of the wireless communications network a positioning signal transmission/reception request to transmit or receive positioning signals, the positioning signal transmission/reception request comprising an indication of a priority associated with the positioning signals.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1]3GPP TS 38.300 v. 15.2.0 "NR; NR and NG-RAN Overall Description; Stage 2(Release 15)", June 2018

[2] Holma H. and Toskala A, "LTE for UMTS OFDMA and SC-FDMA based radio access", John Wiley and Sons, 2009

[3] 3GPP TS 36.305 v.16.1.0 "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16)", July 2020

[4] 3GPP TS 38.305 v.16.1.0 "3rd Generation Partnership Project; Technical Specification Group Radio Access Network; NG Radio Access Network (NG-RAN); Stage 2 functional specification of User Equipment (UE) positioning in NG-RAN (Release 16)", July 2020

[5] International patent application PCT/US2019/0474746, published as WO2020/068310 A1, 2 Apr. 2020.

[6] 3GPP TS 38.214, "NR: Physical layer procedures for data (Rel-16)"

[7] 3GPP TS 38.211, "NR: Physical channels and modulation (Rel-16)"

[8] 3GPP TS 38.455, "NG-RAN; NR Positioning Protocol A (NRPPa) (Rel-16)"

What is claimed is:

1. A method of operating a communications device in a wireless communications network, the method comprising:
   determining first positioning signal resources, the first positioning signal resources comprising communication resources allocated for transmission or reception by the communications device of positioning signals associated with a positioning procedure,
   determining other communication resources allocated for transmission or reception by the communications device of other signals,
   determining that the communications device cannot use both the first positioning signal resources for the transmission or reception of the positioning signals and the other communication resources for the transmission or reception of the other signals,
   determining relative priorities of the first positioning signal resources and the other communication resources,
   based on the relative priorities, controlling a transmitter or receiver of the communications device to transmit or receive the positioning signals using the first positioning signal resources or to transmit or receive the other signals using the other communication resources,
   wherein the relative priority of the first positioning signal resources is higher than the relative priority of the other communication resources, and
   transmitting or receiving the positioning signals using the first positioning signal resources and refraining from transmitting or receiving the other signals using the other communication resources.

2. The method according to claim 1, wherein the other signals are associated with data.

3. The method according to claim 2, wherein the data is enhanced mobile broadband (eMBB) data.

4. The method according to claim 1, wherein the other signals are reference signals.

5. The method according to claim 4, wherein the reference signals are periodic positioning reference signals.

6. The method according to claim 4, wherein the reference signals are channel state information reference signals or sounding reference signals not associated with a positioning procedure.

7. The method according to claim 1, wherein the other signals are associated with control information and the other communication resources comprise resources of a control channel.

8. The method according to claim 1, wherein the other signals are associated with ultra-reliable low latency communications (URLLC) data, and
   the relative priority of the first positioning signal resources is lower than the relative priority of the other communication resources.

9. The method according to claim 1, wherein the other resources are on a shared channel of a wireless access interface.

10. The method according to claim 1, wherein the positioning signals are positioning reference signals (PRS) transmitted by an infrastructure equipment of the wireless communications network, and the first positioning signal resources are allocated for the reception by the communications device of the positioning signals.

11. The method according to claim 1, wherein the positioning signals are sounding reference signals (SRS) and the first positioning signal resources are allocated for the transmission by the communications device of the positioning signals.

12. The method according to claim 1, wherein determining the first positioning signal resources comprises
   receiving a positioning request from a location server in a core network of the wireless communications network, the positioning request comprising an indication of the first positioning signal resources.

13. The method according to claim 1, the method comprising
   receiving an indication of a priority associated with the positioning signals or the first positioning signal resources, and wherein the relative priorities of the first positioning signal resources and the other communication resources are determined based on the priority associated with the positioning signals or the first positioning signal resources.

14. The method according to claim 13, wherein the indication of the priority is received from infrastructure equipment.

15. The method according to claim 14, the method comprising
   receiving downlink control information (DCI), the DCI comprising the indication of the priority.

16. The method according to claim 15, the method comprising
   receiving a resource and priority indication, the resource and priority indication indicating a plurality of resources, wherein the DCI comprises an indication of one of the plurality of resources and
   the determining the first positioning signal resources is based on the indication of the one of the plurality of resources.

17. The method according to claim 1, the method comprising
   receiving an indication of a plurality of positioning signal resources including the first positioning signal resources and
   for each one of the plurality of positioning signal resources other than the first positioning signal resources,
   determining whether other communication resources are allocated to the communications device such that, in accordance with the configuration or the capability of the communications device, the communications device cannot use both the one of the plurality of positioning signal resources for the transmission or reception of positioning signals and the other communication resources for the transmission or reception of other signals, and if so, based on relative priorities of the one of the plurality of positioning signal resources and the other communication resources, selectively controlling a transmitter or receiver of the communications device to transmit or receive positioning signals using the one of the plurality of positioning signal resources.

18. A communications device for operating in a wireless communications network, the communications device comprising:

a transmitter configured to transmit signals on a wireless access interface provided by an infrastructure equipment of the wireless communications network, a receiver configured to receive signals on the wireless access interface, and a controller configured to control the transmitter and the receiver so that the wireless communications device is operable:

to determine first positioning signal resources, the first positioning signal resources comprising communication resources allocated for transmission or reception by the communications device of positioning signals associated with a positioning procedure, to determine other communication resources allocated for transmission or reception by the communications device of other signals, to determine that the communications device cannot use both the first positioning signal resources for the transmission or reception of the positioning signals and the other communication resources for the transmission or reception of the other signals, to determine relative priorities of the first positioning signal resources and the other communication resources, and based on the relative priorities, to transmit or receive the positioning signals using the first positioning signal resources or to transmit or receive the other signals using the other communication resources, wherein the relative priority of the first positioning signal resources is higher than the relative priority of the other communication resources, and transmit or receive the positioning signals using the first positioning signal resources and refrain from transmitting or receiving the other signals using the other communication resources.

19. Infrastructure equipment for use in a wireless communications network, the infrastructure equipment providing a wireless access interface, the infrastructure equipment comprising:

a transmitter configured to transmit signals via the wireless access interface, a receiver configured to receive signals, and a controller configured to control the transmitter and the receiver so that the infrastructure equipment is operable to receive a positioning signal transmission/reception request to transmit or receive positioning signals, the positioning signal transmission/reception request comprising an indication of a priority associated with the positioning signals, based on relative priorities, to transmit or receive the positioning signals using the first positioning signal resources or to transmit or receive other signals using other communication resources, wherein the relative priority of the first positioning signal resources is higher than the relative priority of the other communication resources, and transmit or receive the positioning signals using the first positioning signal resources and refrain from transmitting or receiving the other signals using the other communication resources.

* * * * *